United States Patent
Muñoz De La Torre Alonso et al.

(10) Patent No.: US 12,232,004 B2
(45) Date of Patent: Feb. 18, 2025

(54) PROVISIONING AND EXPOSING USER EQUIPMENT (UE) COMMUNICATION PATTERN ASSOCIATED WITH AN APPLICATION TO REQUEST TRAFFIC OF THE APPLICATION TO BE ANALYZED IN THE CORE NETWORK (CN)

(71) Applicant: Telefonaktiebolaget LM Ericsson (PUBL), Stockholm (SE)

(72) Inventors: Miguel Angel Muñoz De La Torre Alonso, Madrid (ES); Miguel Angel Puente Pestaña, Madrid (ES); Rodrigo Alvarez Dominguez, Madrid (ES)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 309 days.

(21) Appl. No.: 17/765,942

(22) PCT Filed: Sep. 25, 2020

(86) PCT No.: PCT/EP2020/076992
§ 371 (c)(1),
(2) Date: Apr. 1, 2022

(87) PCT Pub. No.: WO2021/063844
PCT Pub. Date: Apr. 8, 2021

(65) Prior Publication Data
US 2022/0345865 A1 Oct. 27, 2022

(30) Foreign Application Priority Data
Oct. 4, 2019 (EP) .................................... 19382862

(51) Int. Cl.
*H04W 4/60* (2018.01)
*H04W 28/02* (2009.01)
*H04W 48/16* (2009.01)

(52) U.S. Cl.
CPC ......... *H04W 4/60* (2018.02); *H04W 28/0215* (2013.01); *H04W 48/16* (2013.01)

(58) Field of Classification Search
CPC .... H04W 4/60; H04W 28/0215; H04W 48/16
(Continued)

(56) References Cited

U.S. PATENT DOCUMENTS

2019/0222489 A1  7/2019  Shan

OTHER PUBLICATIONS

3GPP TS 23.288 v16.1.0; Technical Specification; 3rd Generation Partnership Project; Technical Specification Group Services and System Aspects; Architecture enhancements for 5G System (5GS) to support network data analytics services (Release 16)—Sep. 2019.
(Continued)

*Primary Examiner* — Ahmad F. Matar
*Assistant Examiner* — Jirapon Tulop
(74) *Attorney, Agent, or Firm* — Weisberg I.P. Law, P.A.

(57) ABSTRACT

Embodiments include a method, in an application function, AF, for exchanging UE communication pattern information with a core network, CN. The method comprises provisioning, to a network exposure function, NEF, in the CN, communication information related to one or more user equipment, UEs, the communication information including an identifier of an application associated with the AF and an indication of one or more first parameters describing a first UE communication pattern associated with the application. The method further comprises sending, to the NEF, a subscription request, wherein the subscription request includes the identifier of the application. Further still, the method comprises receiving, from the NEF, a report indicative of an analysis of traffic of the application based at least on the one or more first parameters.

22 Claims, 22 Drawing Sheets

(58) Field of Classification Search
USPC .................................................. 455/456.1
See application file for complete search history.

(56) References Cited

OTHER PUBLICATIONS

3GPP TS 29.122 v16.2.0; Technical Specification; 3rd Generation Partnership Project; Technical Specification Group Core Network and Terminals; T8 reference point for Northbound APIs; (Release 16)—Jun. 2019.

3GPP TSG-CT3 Meeting #106; Portoroz, Slovenia; Change Request; Title: Clarify references to QoS sustainability analytics; Source to WG: VODAFONE Group Plc (C3-194216)—Oct. 7-11, 2019.

PCT International Search Report issued for International application No. PCT/EP2020/076992—Dec. 14, 2020.

PCT Written Opinion of the International Searching Authority for International application No. PCT/EP2020/076992—Dec. 14, 2020.

Chinese Office Action with English language machine translation dated Nov. 5, 2024 for Patent Application No. 202080069307.0, consisting of 26 pages.

3GPP TS 23.502 V15.0.0; 3rd Generation Partnership Project; Technical Specification Group Services and System Aspects; Procedures for the 5G System; Stage 2 (Release 15); Dec. 2017, consisting of 258 pages.

| Attribute name | Data type | Cardinality | Description | Applicability |
|---|---|---|---|---|
| setId | string | 1 | SCS/AS-chosen correlator provided by the SCS/AS in the request to create a resource to CP parameter set(s). | |
| self | Link | 0..1 | Link to the resource "Individual CP set Provisioning". This parameter shall be supplied by the SCEF in HTTP responses. | |
| validityTime | DateTime | 0..1 | Identifies when the CP parameter set expires and shall be deleted. If absent, it indicates that there is no expiration time for this CP parameter set. | |
| periodicCommunicationIndicator | CommunicationIndicator | 0..1 | Identifies whether UE communicates periodically or on demand. | |
| communicationDurationTime | DurationSec | 0..1 | Identifies duration time of periodic communication | |
| periodicTime | DurationSec | 0..1 | Identifies interval time of periodic communication | |
| scheduledCommunicationTime | ScheduledCommunicationTime | 0..1 | Identifies time zone and day of the week when the UE is available for communication. | |
| stationaryIndication | StationaryIndication | 0..1 | Identifies whether the UE is stationary or mobile. | |
| batteryInd | BatteryIndication | 0..1 | Indicates the power consumption type of the UE. | |
| trafficProfile | TrafficProfile | 0..1 | Identifies the type of data transmission. | |
| expectedUmts | array(LocationArea5G) | 0..N | Identifies the UE's expected geographical movement. The attribute is only applicable in 5G. | ExpectedUMT_5G |

*FIG. 5A*

| Attribute name | Data type | P | Cardinality | Description | Applicability |
|---|---|---|---|---|---|
| analyEvent | AnalyEvent | M | 1..N | Detected analytics event | |
| timeStamp | DateTime | M | 1 | Time at which the event is observed. | |
| gpsi | Gpsi | O | 0..1 | Gpsi shall contain either an External Id or an MSISDN. | |
| ueMobilityInfo | UeMobilityInfo | C | 0..1 | Contains the UE mobility information. Shall be present if the "analyEvent" attribute sets to "UE_MOBILITY". | Ue_Mobility |
| ueCommInfo | UeCommtionInfo | C | 0..1 | Contains the application communication information. Shall be present if the "analyEvent" attribute sets to "UE_COMM". | Ue_Communication |
| abnormalInfo | AbnormalInfo | C | 0..1 | Contains the user's abnormal behavior information. Shall be present if the "analyEvent" attribute sets to "ABNORMAL_BEHAVIOR". | Abnormal_Behavior |
| congestInfo | CongestInfo | C | 0..1 | Contains the UE's user data congestion information. Shall be present if the "analyEvent" attribute sets to "CONGESTION". | Congestion |

FIG. 5B

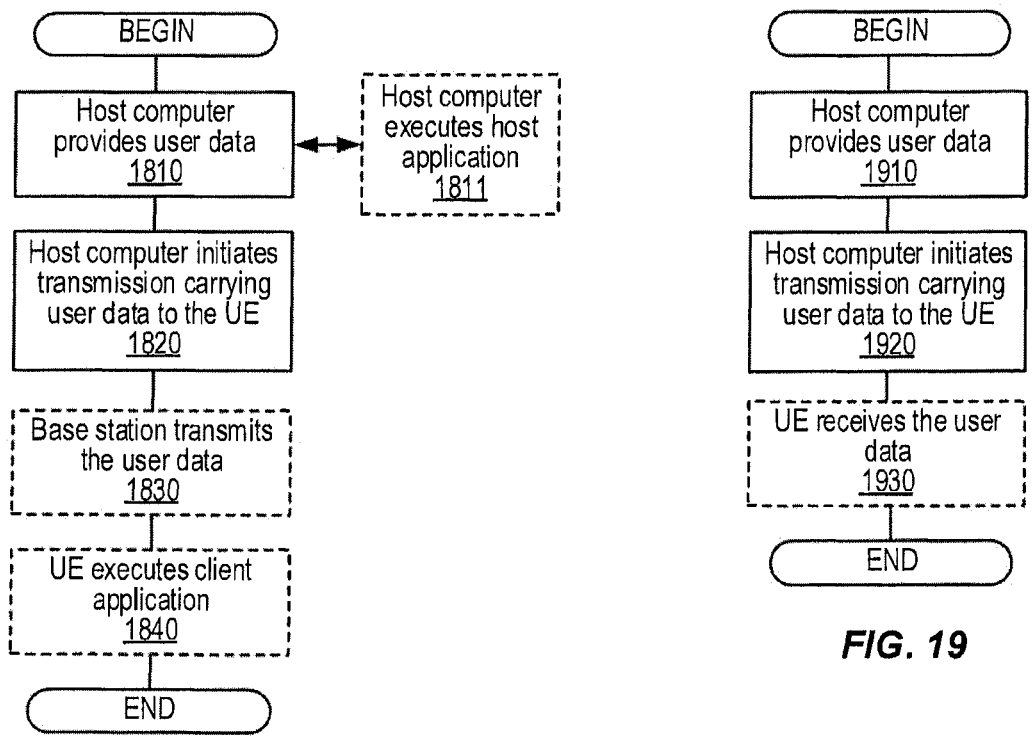
FIG. 18
FIG. 19
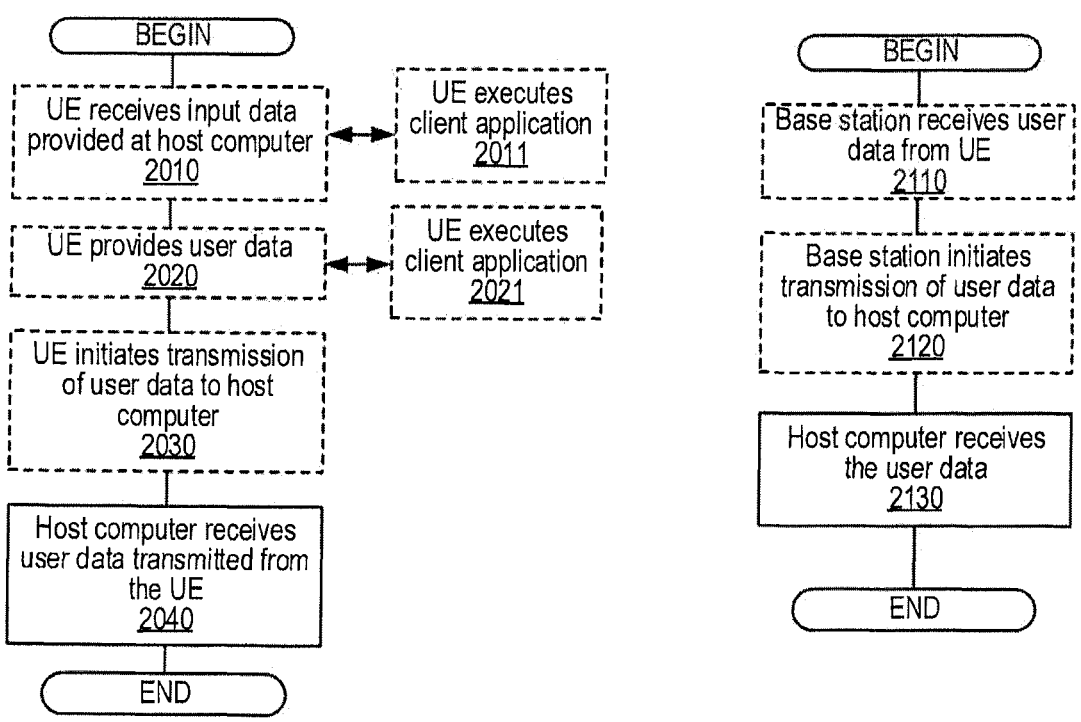
FIG. 20
FIG. 21

PROVISIONING AND EXPOSING USER EQUIPMENT (UE) COMMUNICATION PATTERN ASSOCIATED WITH AN APPLICATION TO REQUEST TRAFFIC OF THE APPLICATION TO BE ANALYZED IN THE CORE NETWORK (CN)

PRIORITY

This nonprovisional application is a U.S. National Stage Filing under 35 U.S.C. § 371 of International Patent Application Serial No. PCT/EP2020/076992 filed Sep. 25, 2020 and entitled "Provisioning and Exposing User Equipment (UE) Communication Pattern Associated With an Application to Request Traffic of the Application to be Analyzed in the Core Network (CN)" which claims priority to European Patent Application No. 19 382 862.1 filed Oct. 4, 2019 both of which are hereby incorporated by reference in their entirety.

TECHNICAL FIELD

The present application relates generally to the field of communication networks and more specifically to techniques for network discovery and exposure of communication patterns of user equipment (e.g., in a communication network) to content providers (e.g., outside of the network).

BACKGROUND

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods and/or procedures disclosed herein do not have to be performed in the exact order disclosed, unless a step is explicitly described as following or preceding another step and/or where it is implicit that a step must follow or precede another step. Any feature of any of the embodiments disclosed herein can be applied to any other embodiment, wherever appropriate. Likewise, any advantage of any of the embodiments can apply to any other embodiments, and vice versa. Other objectives, features and advantages of the enclosed embodiments will be apparent from the following description.

Long Term Evolution (LTE) is an umbrella term for so-called fourth-generation (4G) radio access technologies developed within the Third-Generation Partnership Project (3GPP) and initially standardized in Releases 8 and 9, also known as Evolved UTRAN (E-UTRAN). LTE is targeted at various licensed frequency bands and is accompanied by improvements to non-radio aspects commonly referred to as System Architecture Evolution (SAE), which includes Evolved Packet Core (EPC) network. LTE continues to evolve through subsequent releases. One of the features of Release 11 is an enhanced Physical Downlink Control Channel (ePDCCH), which has the goals of increasing capacity and improving spatial reuse of control channel resources, improving inter-cell interference coordination (ICIC), and supporting antenna beamforming and/or transmit diversity for control channel.

An overall exemplary architecture of a network comprising LTE and SAE is shown in FIG. 1. E-UTRAN 100 includes one or more evolved Node B's (eNB), such as eNBs 105, 110, and 115, and one or more user equipment (UE), such as UE 120. As used within the 3GPP standards, "user equipment" or "UE" means any wireless communication device (e.g., smartphone or computing device) that is capable of communicating with 3GPP-standard-compliant network equipment, including E-UTRAN as well as UTRAN and/or GERAN, as the third- ("3G") and second-generation ("2G") 3GPP radio access networks are commonly known.

As specified by 3GPP, E-UTRAN 100 is responsible for all radio-related functions in the network, including radio bearer control, radio admission control, radio mobility control, scheduling, and dynamic allocation of resources to UEs in uplink and downlink, as well as security of the communications with the UE. These functions reside in the eNBs, such as eNBs 105, 110, and 115. The eNBs in the E-UTRAN communicate with each other via the X1 interface, as shown in FIG. 1. The eNBs also are responsible for the E-UTRAN interface to the EPC 130, specifically the S1 interface to the Mobility Management Entity (MME) and the Serving Gateway (SGW), shown collectively as MME/S-GWs 134 and 138 in FIG. 1. Generally speaking, the MME/S-GW handles both the overall control of the UE and data flow between the UE and the rest of the EPC. More specifically, the MME processes the signaling (e.g., control plane) protocols between the UE and the EPC, which are known as the Non-Access Stratum (NAS) protocols. The S-GW handles all Internet Protocol (IP) data packets (e.g., data or user plane) between the UE and the EPC and serves as the local mobility anchor for the data bearers when the UE moves between eNBs, such as eNBs 105, 110, and 115.

EPC 130 can also include a Home Subscriber Server (HSS) 131, which manages user- and subscriber-related information. HSS 131 can also provide support functions in mobility management, call and session setup, user authentication and access authorization. The functions of HSS 131 can be related to the functions of legacy Home Location Register (HLR) and Authentication Centre (AuC) functions or operations.

In some embodiments, HSS 131 can communicate with a user data repository (UDR)—labelled EPC-UDR 135 in FIG. 1—via a Ud interface. The EPC-UDR 135 can store user credentials after they have been encrypted by AuC algorithms. These algorithms are not standardized (i.e., vendor-specific), such that encrypted credentials stored in EPC-UDR 135 are inaccessible by any other vendor than the vendor of HSS 131.

In 3GPP, a study item on a new radio interface for a fifth-generation (5G) cellular (e.g., wireless) network has been completed, and 3GPP is now standardizing this new radio interface, often abbreviated by NR (New Radio). FIG. 2 illustrates a high-level view of the 5G network architecture, consisting of a Next Generation RAN (NG-RAN) 299 and a 5G Core (5GC) 298. NG-RAN 299 can include a set of gNodeB's (gNBs) connected to the 5GC via one or more NG interfaces, such as gNBs 200, 250 connected via interfaces 202, 252, respectively. In addition, the gNBs can be connected to each other via one or more Xn interfaces, such as Xn interface 240 between gNBs 200 and 250. With respect the NR interface to UEs, each of the gNBs can support frequency division duplexing (FDD), time division duplexing (TDD), or a combination thereof.

NG-RAN 299 is layered into a Radio Network Layer (RNL) and a Transport Network Layer (TNL). The NG-RAN architecture, i.e., the NG-RAN logical nodes and interfaces between them, is defined as part of the RNL. For each NG-RAN interface (NG, Xn, F1) the related TNL protocol and the functionality are specified. The TNL provides services for user plane transport and signaling transport. In some exemplary configurations, each gNB is connected to all 5GC nodes within an "AMF Region," which is defined in 3GPP TS 23.501. If security protection for CP and UP data on TNL of NG-RAN interfaces is supported, NDS/IP (3GPP TS 33.401) shall be applied.

The NG RAN logical nodes shown in FIG. 2 (and described in 3GPP TS 38.401 and 3GPP TR 38.801) include a central (or centralized) unit (CU or gNB-CU) and one or more distributed (or decentralized) units (DU or gNB-DU). For example, gNB 200 includes gNB-CU 210 and gNB-DUs 220 and 230. CUs (e.g., gNB-CU 210) are logical nodes that host higher-layer protocols and perform various gNB functions such controlling the operation of DUs. Each DU is a logical node that hosts lower-layer protocols and can include, depending on the functional split, various subsets of the gNB functions. As such, each of the CUs and DUs can include various circuitry needed to perform their respective functions, including processing circuitry, transceiver circuitry (e.g., for communication), and power supply circuitry. Moreover, the terms "central unit" and "centralized unit" are used interchangeably herein, as are the terms "distributed unit" and "decentralized unit."

A gNB-CU connects to gNB-DUs over respective F1 logical interfaces, such as interfaces 222 and 232 shown in FIG. 3. The gNB-CU and connected gNB-DUs are only visible to other gNBs and the 5GC as a gNB. In other words, the F1 interface is not visible beyond gNB-CU.

FIG. 3 shows a high-level view of an exemplary 5G network architecture, including a Next Generation Radio Access Network (NG-RAN) 399 and a 5G Core (5GC) 398. As shown in the figure, NG-RAN 399 can include gNBs 310 (e.g., 310a,b) and ng-eNBs 320 (e.g., 320a,b) that are interconnected with each other via respective Xn interfaces. The gNBs and ng-eNBs are also connected via the NG interfaces to 5GC 398, more specifically to the AMF (Access and Mobility Management Function) 330 (e.g., AMFs 330a, b) via respective NG-C interfaces and to the UPF (User Plane Function) 340 (e.g., UPFs 340a,b) via respective NG-U interfaces. Moreover, the AMFs 340a,b can communicate with one or more policy control functions (PCFs, e.g., PCFs 350a,b) and network exposure functions (NEFs, e.g., NEFs 360a,b). The AMFs, UPFs, PCFs, and NEFs are described further below.

Each of the gNBs 310 can support the NR radio interface, including frequency division duplexing (FDD), time division duplexing (TDD), or a combination thereof. In contrast, each of ng-eNBs 320 supports the LTE radio interface but, unlike conventional LTE eNBs (such as shown in FIG. 1), connect to the 5GC via the NG interface.

Deployments based on different 3GPP architecture options (e.g., EPC-based or 5GC-based) and UEs with different capabilities (e.g., EPC NAS and 5GC NAS) may coexist at the same time within one network (e.g., PLMN). It is generally assumed that a UE that can support 5GC NAS procedures can also support EPC NAS procedures (e.g., as defined in 3GPP TS 24.301) to operate in legacy networks, such as when roaming. As such, the UE will use EPC NAS or 5GC NAS procedures depending on the core network (CN) by which it is served.

Another change in 5G networks (e.g., in 5GC) is that traditional peer-to-peer interfaces and protocols (e.g., those found in LTE/EPC networks) are modified by a so-called Service Based Architecture (SBA) in which Network Functions (NFs) provide one or more services to one or more service consumers. This can be done, for example, by Hyper Text Transfer Protocol/Representational State Transfer (HTTP/REST) application programming interfaces (APIs). In general, the various services are self-contained functionalities that can be changed and modified in an isolated manner without affecting other services.

Furthermore, the services are composed of various "service operations", which are more granular divisions of the overall service functionality. In order to access a service, both the service name and the targeted service operation must be indicated. The interactions between service consumers and producers can be of the type "request/response" or "subscribe/notify". In the 5G SBA, network repository functions (NRF) allow every network function to discover the services offered by other network functions, and Data Storage Functions (DSF) allow every network function to store its context.

As discussed above, services can be deployed as part of a network function (NF) in the 5G SBA. This SBA model, which further adopts principles like modularity, reusability and self-containment of NFs, can enable deployments to take advantage of the latest virtualization and software technologies. FIG. 4 shows an exemplary non-roaming 5G reference architecture with service-based interfaces and various 3GPP-defined NFs within the Control Plane (CP). These include the following NFs, with additional details provided for those most relevant to the present disclosure:

Access and Mobility Management Function (AMF) with Namf interface;

Session Management Function (SMF) with Nsmf interface—interacts with the decoupled user (or data) plane, creating updating and removing Protocol Data Unit (PDU) sessions and managing session context with the User Plane Function (UPF), e.g., for event reporting;

User Plane Function (UPF) with Nupf interface—supports handling of user plane traffic based on the rules received from SMF, including packet inspection and different enforcement actions (e.g. event detection and reporting);

Policy Control Function (PCF) with Npcf interface—supports unified policy framework to govern the network behavior, e.g., via providing PCC rules to the SMF;

Network Exposure Function (NEF) with Nnef interface—acts as the entry point into operator's network, by securely exposing to AFs the network capabilities and events provided by 3GPP NFs and by providing ways for the AF to securely provide information to 3GPP network;

Network Repository Function (NRF) with Nnrf interface;

Network Slice Selection Function (NSSF) with Nnssf interface;

Authentication Server Function (AUSF) with Nausf interface;

Application Function (AF) with Naf interface—interacts with the 3GPP CN to provision information to the network operator and to subscribe to certain events happening in operator's network;

Network Data Analytics Function (NWDAF) (not shown); and

Unified Data Management (UDM) with Nudm interface.

The UDM is similar to the HSS in LTE/EPC networks discussed above. UDM supports Generation of 3GPP AKA authentication credentials, user identification handling, access authorization based on subscription data, and other subscriber-related functions. To provide this functionality, the UDM uses subscription data (including authentication data) stored in the 5GC unified data repository (UDR). In addition to the UDM, the UDR supports storage and retrieval of policy data by the PCF, as well as storage and retrieval of application data by NEF.

3GPP Rel-15 also specifies a Network Data Analytics Function (NWDAF) including services (referred to as "Nnwdaf") that facilitate basic policy and network slicing control based on analytics information, which can include statistical information of the past events and/or predictive information. 3GPP Rel-16 enhances the Rel-15 analytics architecture and services based on a new 3GPP TS 23.288 (v16.0.0). Different NWDAF instances may be present in the 5GC, with possible specializations per categories of analytics. The capabilities of a particular NWDAF instance are described in the NWDAF profile stored in the NRF. In addition, various other NFs provide specific services in support of the NWDAF.

Even so, there are various problems and/or deficiencies associated with these existing solutions. For example, current techniques for provisioning of UE communication patterns in the 5G network or other networks do not provide sufficient information for AFs to determine how UEs are actually going to connect and/or behave in the 5G network. In general, it would be desirable to extend the reporting capabilities of core networks in regard to UE traffic from the perspective of the AFs.

SUMMARY

Accordingly, exemplary embodiments of the present disclosure address these and other difficulties in exchanging UE communication pattern information between a core network and an application function (AF), e.g., associated with an application.

Exemplary embodiments of the present disclosure include methods and/or procedures for exchanging UE communication pattern information with a core network (CN), according to various exemplary embodiments of the present disclosure. These exemplary methods and/or procedures can be performed by an application function (AF, e.g., an application server) associated with an application internal to, or external from, the CN.

These exemplary methods and/or procedures can include provisioning, to the CN, communication information related to one or more user equipment (UEs). The communication information can include an identifier of an application associated with the AF, and a plurality of first parameters describing an expected UE communication pattern associated with the application. The plurality of first parameters can be arranged in one or more sets associated with respective connection phases.

In some embodiments, each set of first parameters can be associated with one of the following connection phases: bootstrap, registration, device management, and information reporting. In some embodiments, each set of first parameters can include one or more of the following first parameters: security, data packet size, number of data packets, traffic volume, number of flows, packet interarrival time, packet round trip delay, and connection origin. In some embodiments, at least one of the first parameters includes one or more of the following: a maximum value, a minimum value, and an average value. In some embodiments, the communication information may include identifiers of the plurality of first parameters.

These exemplary methods and/or procedures can also include sending, to the CN, a subscription request for one or more second parameters describing an actual UE communication pattern associated with the application and the one or more UEs. The subscription request can include the identifier of the application. In some embodiments, the subscription request can also include identifiers of the one or more second parameters. In some embodiments, the one or more second parameters are included in the one or more first parameters, while in other embodiments, the one or more second parameters include at least one parameter not included in the one or more first parameters.

These exemplary methods and/or procedures can also include receiving, from the CN, a report including the one or more second parameters. In some embodiments, the report includes second parameters that are associated with a particular connection phase that is also associated with a particular set of the first parameters.

Other exemplary embodiments of the present disclosure include methods and/or procedures for exchanging UE communication pattern information with an application function (AF). These exemplary methods and/or procedures can be performed by a network exposure function (NEF) in a CN (e.g., a 5GC).

These exemplary methods and/or procedures can include receiving, from the AF, communication information related to one or more user equipment (UEs). The communication information can include an identifier of an application associated with the AF, and a plurality of first parameters describing an expected UE communication pattern associated with the application. The plurality of first parameters can be arranged in one or more sets associated with respective connection phases.

In some embodiments, each set of first parameters can be associated with one of the following connection phases: bootstrap, registration, device management, and information reporting. In some embodiments, each set of first parameters can include one or more of the following first parameters: security, data packet size, number of data packets, traffic volume, number of flows, packet interarrival time, packet round trip delay, and connection origin. In some embodiments, at least one of the first parameters includes one or more of the following: a maximum value, a minimum value, and an average value. In some embodiments, the communication information may include identifiers of the plurality of first parameters.

In some embodiments, these exemplary methods and/or procedures can also include sending, to a network repository function (NRF), a discovery request to identify a network data analytics function (NWDAF) that supports the first parameters. In some embodiments, these exemplary methods and/or procedures can also include receiving, from the NRF, an indication that a first NWDAF supports the first parameters, and sending, to the first NWDAF, a message comprising the identifier of the application and identifiers of the first parameters.

These exemplary methods and/or procedures can also include receiving, from the AF, a subscription request for one or more second parameters describing an actual UE communication pattern associated with the application and the one or more UEs. The subscription request can include the identifier of the application, e.g., as previously received. In some embodiments, the subscription request can also include identifiers of the one or more second parameters. In some embodiments, the one or more second parameters are included in the one or more first parameters, while in other embodiments, the one or more second parameters include at least one parameter not included in the one or more first parameters.

In some embodiments, these exemplary methods and/or procedures can also include determining if the first NWDAF supports the second parameters, and based on determining that the first NWDAF supports the second parameters, sending a second subscription request to the first NWDAF. The second subscription request can include the identifier of the application and identifiers of the second parameters. In such embodiments, these exemplary methods and/or procedures can also include receiving, from the NWDAF, a report including the one or more second parameters.

These exemplary methods and/or procedures can also include sending, to the AF, the report including the one or more second parameters.

Other exemplary embodiments of the present disclosure include methods and/or procedures for exchanging UE communication pattern information with an application function (AF). These exemplary methods and/or procedures can be performed by a network data analytics function (NWDAF) in a CN (e.g., a 5GC).

In some embodiments, these exemplary methods and/or procedures can include sending a registration request to a network repository function (NRF) in the CN. The registration request can include an identifier of the NWDAF; identifiers of one or more services, associated with UE communication information, that are supported by the NWDAF; and identifiers of one or more parameters, associated with UE communication, that can be generated by the NWDAF.

In some embodiments, these exemplary methods and/or procedures can also include receiving, from a network exposure function (NEF), a message comprising an identifier of an application associated with an application function (AF), and a plurality of first parameters describing an expected UE communication pattern associated with the application and with one or more UEs. The plurality of first parameters can be arranged in one or more sets associated with respective connection phases.

In some embodiments, each set of first parameters can be associated with one of the following connection phases: bootstrap, registration, device management, and information reporting. In some embodiments, each set of first parameters can include one or more of the following first parameters: security, data packet size, number of data packets, traffic volume, number of flows, packet interarrival time, packet round trip delay, and connection origin. In some embodiments, at least one of the first parameters includes one or more of the following: a maximum value, a minimum value, and an average value. In some embodiments, the message may include identifiers of the plurality of first parameters.

These exemplary methods and/or procedures can also include receiving, from the NEF, a subscription request associated with the AF. The subscription request can include an identifier of an application associated with the AF, and identifiers of one or more second parameters describing an actual UE communication pattern associated with the application and with one or more UEs.

These exemplary methods and/or procedures can also include sending, to a user plane function (UPF), a request for one or more traffic metrics associated with the second parameters. The request can include the identifier of the application. In some embodiments, these exemplary methods and/or procedures can also include determining the one or more traffic metrics, to be requested from the UPF, based on the first parameters and the second parameters.

These exemplary methods and/or procedures can also include receive the one or more traffic metrics from the UPF; determining the one or more second parameters based on the traffic metrics; and sending, to the NEF, a report including the one or more second parameters.

Other exemplary embodiments include core networks (e.g., nodes and/or functions) and application functions (AFs) that are configured to perform operations corresponding to any of these exemplary methods and/or procedures described herein. Other exemplary embodiments include non-transitory, computer-readable media storing computer-executable instructions that, when executed by processing circuitry associated with such core network nodes/functions or AFs, configure the same to perform operations corresponding to any of these exemplary methods and/or procedures described herein.

These and other objects, features and advantages of exemplary embodiments of the present disclosure will become apparent upon reading the following Detailed Description in view of the Drawings briefly described below.

BRIEF DESCRIPTION OF THE DRAWINGS

FIGS. 5A-5B are tables illustrating two exemplary data structures usable for providing expected and actual UE communication pattern information.

FIGS. 18-21 are flow diagrams of exemplary methods and/or procedures for transmission and/or reception of user data, according to various exemplary embodiments of the present disclosure.

DETAILED DESCRIPTION

Figure 1:
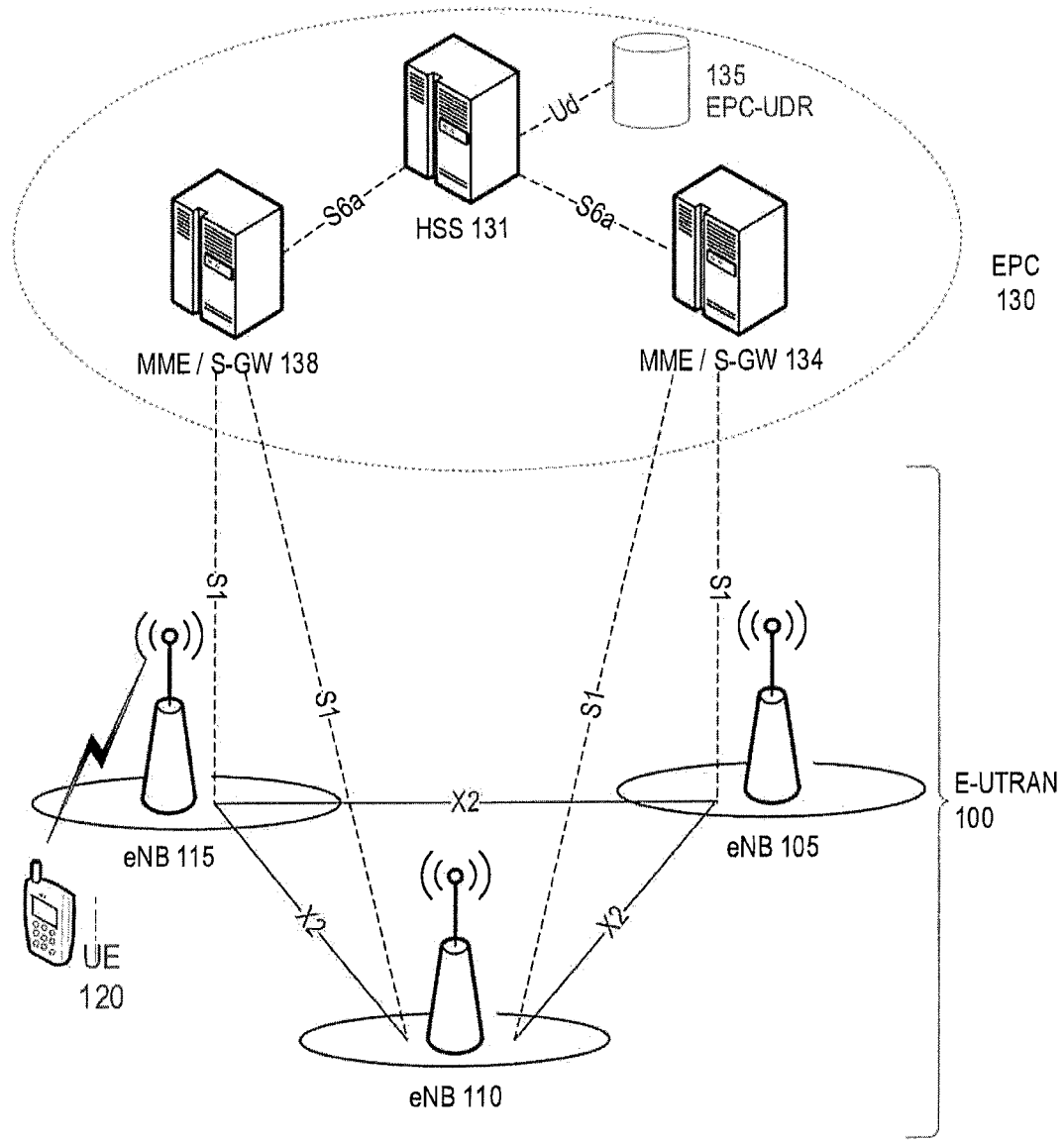
FIG. 1 is a high-level block diagram of an exemplary architecture of the Long-Term Evolution (LTE) Evolved UTRAN (E-UTRAN) and Evolved Packet Core (EPC) network, as standardized by 3GPP.
Figure 2:
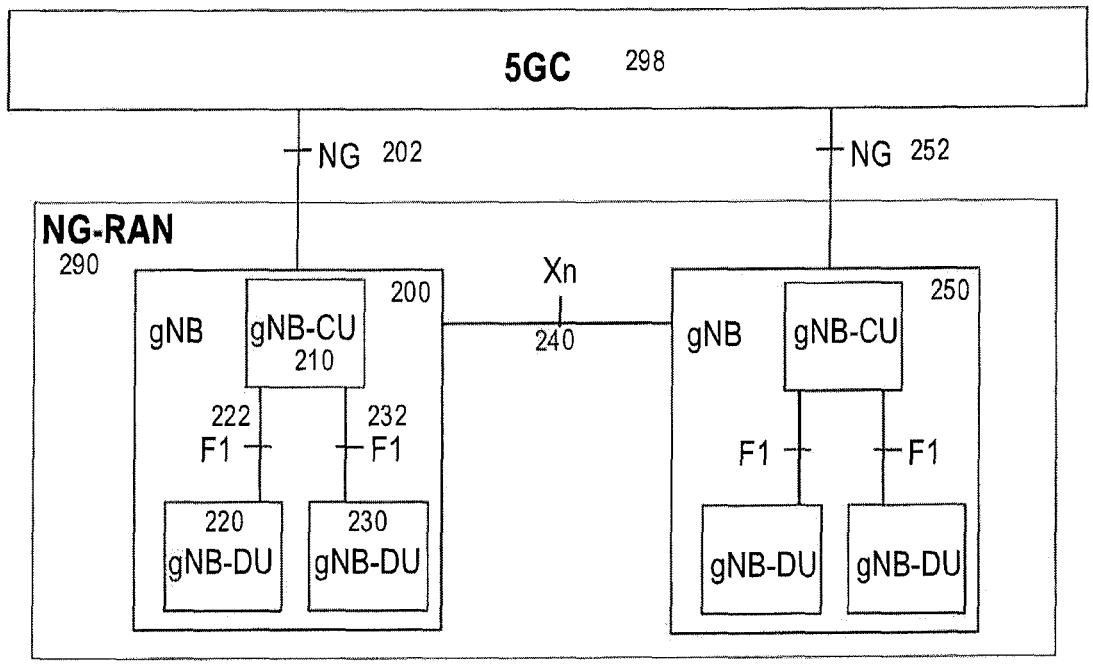
FIGS. 2-3 illustrate two different high-level views of a 5G network architecture.
Figure 3:
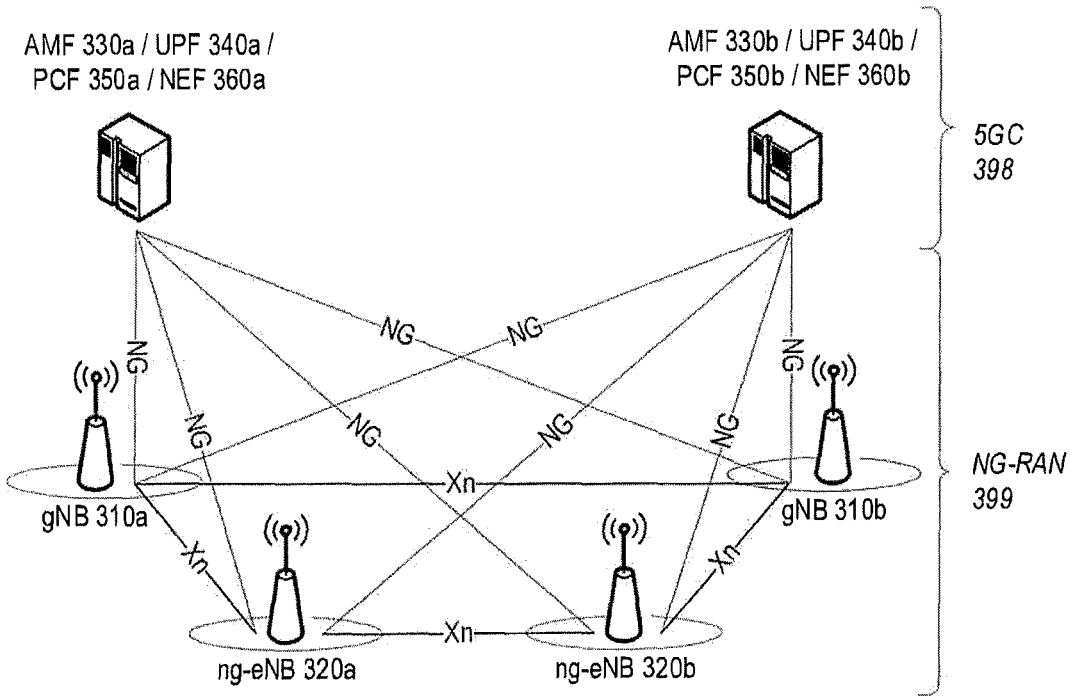
Figure 4:
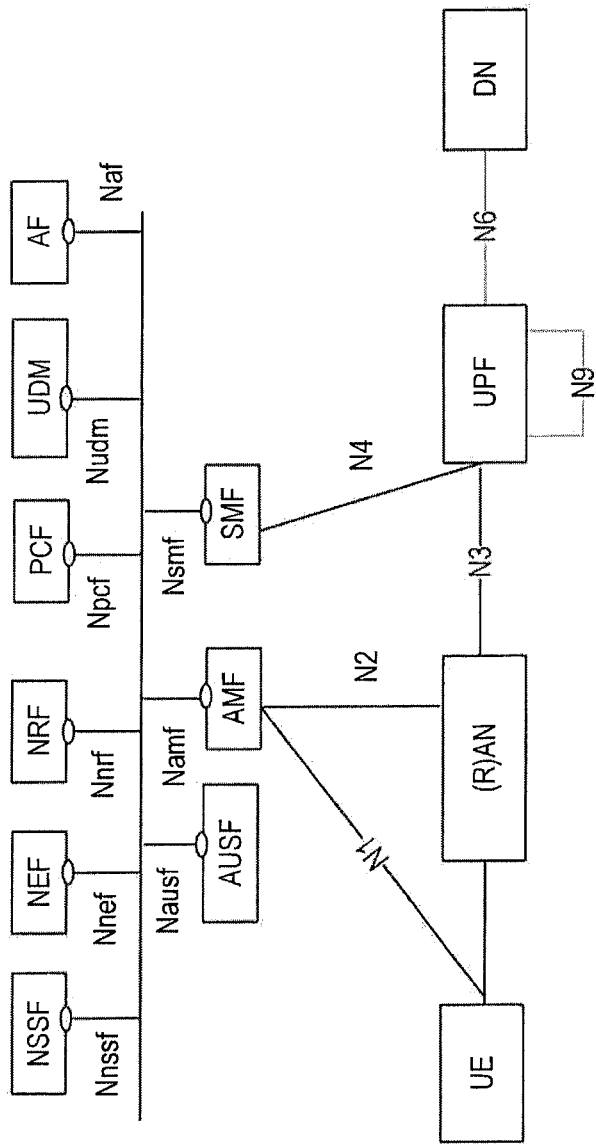
FIG. 4 shows an exemplary non-roaming 5G reference architectures with service-based interfaces and various network functions (NFs) in a core network, as further described in 3GPP TS 23.501 (v16.1.0).

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art. Furthermore, the following terms are used throughout the description given below:
  Radio Node: As used herein, a "radio node" can be either a "radio access node" or a "wireless device."
  Radio Access Node: As used herein, a "radio access node" (or "radio network node") can be any node in a radio access network (RAN) of a cellular communications network that operates to wirelessly transmit and/or receive signals. Some examples of a radio access node include, but are not limited to, a base station (e.g., a New Radio (NR) base station (gNB) in a 3GPP Fifth Generation (5G) NR network or an enhanced or evolved Node B (eNB) in a 3GPP LTE network), a high-power or macro base station, a low-power base station (e.g., a micro base station, a pico base station, a home eNB, or the like), and a relay node.
  Core Network Node: As used herein, a "core network node" is any type of node in a core network. Some examples of a core network node include, e.g., a Mobility Management Entity (MME), a Packet Data Network Gateway (P-GW), a Service Capability Exposure Function (SCEF), or the like.
  Wireless Device: As used herein, a "wireless device" (or "WD" for short) is any type of device that has access to (i.e., is served by) a cellular communications network by communicate wirelessly with network nodes and/or other wireless devices. Unless otherwise noted, the term "wireless device" is used interchangeably herein with "user equipment" (or "UE" for short). Some examples of a wireless device include, but are not limited to, a UE in a 3GPP network and a Machine Type Communication (MTC) device. Communicating wirelessly can involve transmitting and/or receiving wireless signals using electromagnetic waves, radio waves, infrared waves, and/or other types of signals suitable for conveying information through air.
  Network Node: As used herein, a "network node" is any node that is either part of the radio access network or the core network of a cellular communications network. Functionally, a network node is equipment capable, configured, arranged, and/or operable to communicate directly or indirectly with a wireless device and/or with other network nodes or equipment in the cellular communications network, to enable and/or provide wireless access to the wireless device, and/or to perform other functions (e.g., administration) in the cellular communications network.

Note that the description given herein focuses on a 3GPP cellular communications system and, as such, 3GPP terminology or terminology similar to 3GPP terminology is oftentimes used. However, the concepts disclosed herein are not limited to a 3GPP system. Furthermore, although the term "cell" is used herein, it should be understood that (particularly with respect to 5G NR) beams may be used instead of cells and, as such, concepts described herein apply equally to both cells and beams.

In the present disclosure, the term "service" is used generally to refer to a set of data, associated with one or more applications, that is to be transferred via a network with certain specific delivery requirements that need to be fulfilled in order to make the applications successful. In the present disclosure, the term "component" is used generally to refer to any component needed for the delivery of the service. Examples of component are RANs (e.g., E-UTRAN, NG-RAN, or portions thereof such as eNBs, gNBs, base stations (BS), etc.), CNs (e.g., EPC, 5GC, or portions thereof, including all type of links between RAN and CN entities), and cloud infrastructure with related resources such as computation, storage. In general, each component can have a "manager", a term used generally to refer to an entity that can collect historical information about utilization of resources as well as provide information about the current and the predicted future availability of resources associated with that component (e.g., a RAN manager).

As briefly mentioned above, there are various problems and/or deficiencies associated with the amount and/or type of UE information exposed to AFs. For example, current techniques for provisioning of UE communication patterns in the 5G network do not provide sufficient information for AFs to determine how UEs are actually going to connect and/or behave in the 5G network.

More specifically, 3GPP TS 29.122 (v16.3.0), 29.522 (v16.1.0), and 23.501 (v16.1.0) define a Nnef_ParameterProvision service allowing content providers (e.g., AFs) to provision expected UE behaviour and service-specific parameters, such as the communication pattern of a UE. For example, this can be done using the data type CpParameterSet, as defined in FIG. 5A. However, this information lacks various important details about the UE communication pattern to be provisioned, such as the expected amount of traffic generated by the application associated with the AF. As such, the 3GPP network is, for example, unable to determine how UEs are actually going to connect and/or behave in the 3GPP network with respect to this application.

Similarly, these specifications also define a Nnef_AnalyticsExposure service including AF subscription to the UE communication pattern. For example, the NWDAF can obtain a (e.g., current or actual) UE communication pattern and provide such information to the AF in the ueCommInfo information element (IE) of the data type AnalyEventNotif, shown in FIG. 5B. However, the content of ueCommInfo is currently undefined, so it is unclear exactly what information would be provided. As such, even if subscribed to receive such information, AFs are unable to determine how UEs are actually behaving in the network.

Exemplary embodiments of the present disclosure address these and other problems, challenges, and/or issues by providing additional information in various network services to facilitate network and AF awareness of UE communication patterns.

According to one aspect, a method, in an application function, AF, for exchanging UE communication pattern information with a core network, CN, is presented. The method comprises provisioning, to a network exposure function, NEF, in the CN, communication information related to one or more user equipment, UEs, the communication information including an identifier of an application associated with the AF and an indication of one or more first parameters describing a first UE communication pattern associated with the application. The method further comprises sending, to the NEF, a subscription request, wherein the subscription request includes the identifier of the application. Further still, the method comprises receiving, from the NEF, a report indicative of an analysis of traffic of the application based at least on the one or more first parameters.

The one or more first parameters describing the first UE communication pattern may define a traffic model of traffic of the application to be analyzed in the CN. The first UE communication pattern may thus be indicative of a traffic model (e.g., an expected or expectable communication pattern).

The subscription request may be sent for one or more second parameters describing a second UE communication pattern associated with the application and, optionally, the one or more UEs. The second UE communication pattern may be an actual or current communication pattern as actually detected in the application traffic. The second UE communication pattern may be a sub-pattern of the first UE communication pattern (e.g., in that the one or more second parameters further define the first UE communication pattern that is, in turn, defined by the one or more first parameters).

The one or more second parameters may define information about traffic of the application to be reported in the subscription.

The one or more first parameters and the one or more second parameter may jointly define the traffic to be reported in the subscription.

The communication information may trigger the NEF, e.g., upon receipt thereof, to perform a network data analytics function, NWDAF, discovery procedure based on the one or more first parameters. The subscription request may trigger the NEF to forward the one or more second parameters to the NWDAF determined by the NWDAF discovery procedure.

The one or more first parameters may be arranged in one or more sets associated with respective connection phases. Each set of first parameters may be associated with one of the following connection phases: bootstrap, registration, device management, and information reporting. In some scenarios, the communication information further comprises, for a particular first parameter set, information on the associated connection phase.

At least one of the one or more first parameter may include one or more of the following: security, data packet size, number of data packets, traffic volume, number of flows, packet interarrival time, packet round trip delay, and connection origin. At least one of the one or more first parameters may include or be specified by one or more of the following: a maximum value, a minimum value, and an average value. At least one of the one or more first parameters may be specified in the communication information by a parameter type and an associated parameter value (i.e., a type-value pair). The one or more first parameters describing the first UE communication pattern may define traffic characteristics of traffic to be analyzed in the CN.

The one or more second parameters may define traffic characteristics of traffic to be analyzed in the CN. The one or more second parameters may be included in the one or more first parameters. As such, the one or more second parameters may constitute a subset of the one or more first parameters, in particular a true subset. The one or more second parameters may include at least one parameter not included in the one or more first parameters.

The communication information provisioned to the NEF may includes identifiers of the one or more first parameters. The subscription request may include identifiers of the one or more second parameters.

The report may includes one or more second parameters that are associated with a particular connection phase that is also associated with a particular set of the first parameters. The report may includes a numerical value indicative of a percentage of traffic associated with (e.g., fulfilling a constraint defined by) the one or more second parameters.

Also provided is a method according to a second aspect, performed by a network exposure function, NEF, in a core network, CN for exchanging UE communication pattern information with an application function, AF. The method comprises receiving, from the AF, communication information related to one or more user equipment (UEs), the communication information including an identifier of an application associated with the AF, and an indication of one or more first parameters describing a first UE communication pattern associated with the application. The method further comprises receiving, from the AF, a subscription request, wherein the subscription request includes the identifier of the application. Further still, the method comprises sending, to the AF, a report indicative of an analysis of traffic of the application based at least on the one or more first parameters.

Receipt of the communication information may trigger the NEF to perform a network data analytics function, NWDAF, discovery procedure based on the one or more first parameters. The subscription request is received for one or more second parameters may describe a second UE communication pattern associated with the application and the one or more UEs. Optionally, receipt of the subscription request may trigger the NEF to forward the one or more second parameters to the NWDAF determined by the NWDAF discovery procedure.

The one or more first parameters may be arranged in one or more sets associated with respective connection phases. Each set of first parameters may be associated with one of the following connection phases: bootstrap, registration, device management, and information reporting.

At least one of the one or more first parameters may include one or more of the following: security, data packet size, number of data packets, traffic volume, number of flows, packet interarrival time, packet round trip delay, and connection origin. At least one of the one or more first parameters may include or be specified by one or more of the following: a maximum value, a minimum value, and an average value.

The one or more second parameters may included in the one or more first parameters. The one or more second parameters may include at least one parameter not included in the one or more first parameters.

The communication information received from the AF may includes identifiers of the one or more first parameters. The subscription request may include identifiers of the one or more second parameters.

The method of the second aspect may further comprise sending, to a network repository function, NRF, a discovery request to identify a network data analytics function, NWDAF, that supports the one or more first parameters, receiving, from the NRF, an indication that a first NWDAF supports the one or more first parameters, and sending, to the first NWDAF, a message comprising the identifier of the application and identifiers of the one or more first parameters. The method may further comprise determining if the first NWDAF supports the one or more second parameters and, based on determining that the first NWDAF supports the one or more second parameters, sending a second subscription request to the first NWDAF, the second subscription request including the identifier of the application and identifiers of the one or more second parameters. The method may still further comprise receiving, from the first NWDAF, the report responsive to the second subscription request. The method may also comprise, based on determining that the first NWDAF does not support the one or more second parameters, sending, to the NRF, a second discovery request to identify an NWDAF that supports the one or more second parameters, and receiving, from the NRF, an indication that a second NWDAF supports the one or more second parameters, wherein the second subscription request is sent to, and the report received from, the second NWDAF instead of the first NWDAF.

The report may include or relate to one or more second parameters that are associated with a particular connection phase that is also associated with a particular set of the one or more first parameters.

A third aspect is directed to a method, performed by a network data analytics function, NWDAF, in a core network, CN, for exchanging user equipment, UE, communication pattern information with an application function, AF. The method comprises receiving, from a network exposure function, NEF, in the CN, a message comprising an identifier of an application associated with an application function, AF, and an indication of one or more first parameters describing a first UE communication pattern associated with the application and with one or more UEs. The method also comprises receiving, from the NEF, a subscription request associated with the AF, the subscription request including the identifier of the application associated with the AF, and sending, to a user plane function, UPF, a request for one or more traffic metrics, wherein the request includes the identifier of the application. The method further comprises receiving the one or more traffic metrics from the UPF, analyzing the traffic metrics based at least on the one more first parameters, and sending, to the NEF, a report indicative of the analysis.

The method of the third aspect further comprises receiving, from the NEF, and in the subscription request associated with the AF, identifiers of one or more second parameters describing a second UE communication pattern associated with the application and with one or more UEs, and sending, to the UPF, the request for one or more traffic metrics associated with the one or more second parameters.

The one or more first parameters may be arranged in one or more sets associated with respective connection phases. Each set of one or more first parameters may be associated with one of the following connection phases: bootstrap, registration, device management, and information reporting. The one or more first parameters include one or more of the following: security, data packet size, number of data packets, traffic volume, number of flows, packet interarrival time, packet round trip delay, and connection origin. The one or more first parameters may include or specify one or more of the following: a maximum value, a minimum value, and an average value.

The one or more second parameters may be included in the one or more first parameters.

The one or more second parameters include at least one parameter not included in the one or more first parameters. The method may further comprise, prior to receiving the message from the NEF, sending a registration request to a network repository function, NRF, wherein the registration request includes an identifier of the NWDAF, identifiers of one or more services, associated with UE communication information, that are supported by the NWDAF, and identifiers of one or more parameters, associated with UE communication, that can be generated by the NWDAF.

In all the method aspects disclosed herein, the first UE communication pattern may be one of an expected and an expectable UE communication pattern associated with the application. Alternatively, or in addition, the second UE communication pattern may be one of an actual and a current UE communication pattern associated with the application.

Also provided is an application function, AF configured to exchange UE communication pattern information with a core network, CN, the AF comprising interface circuitry configured to communicate with a network exposure function, NEF, in the CN, and processing circuitry operably coupled to the interface circuitry, whereby the processing circuitry and interface circuitry are configured to perform operations corresponding to any of the method aspects related to the AF.

Still further an AF is provided that is configured to exchange UE communication pattern information with a core network, CN, the AF being arranged to perform operations corresponding to any of the method aspects related to the AF.

A non-transitory, computer-readable medium storing computer-executable instructions is provided also that, when executed by processing circuitry associated with an AF, configure the AF to perform operations corresponding to any of the method aspects related to the AF.

A computer program product comprising computer-executable instructions is provided also that, when executed by processing circuitry associated with an AF configure the AF to perform operations corresponding to any of the method aspects related to the AF.

Also provided is a core network, CN, configured to exchange UE communication pattern information with an application function, AF, the CN comprising one or more network nodes configured to provide at least one of a network exposure function, NEF, operable to communicate with the AF, and a network data analytics function, NWDAF, wherein the one or more network nodes include processing circuitry configured to perform operations corresponding to any of the methods of the second and/or third aspect.

The one or more CN nodes may further be configured to provide at least one of a network repository function, NRF, and a user plane function, UPF.

Further provided is a core network, CN, configured to exchange UE communication pattern information with an application function, AF, the CN being arranged to perform operations corresponding to any of the methods of the second and/or third aspect.

A non-transitory, computer-readable medium storing computer-executable instructions is provided also that, when executed by processing circuitry associated with a CN configure the CN to perform operations corresponding to any of the methods of the second and/or third aspect.

Further still, a computer program product is provided comprising computer-executable instructions that, when executed by processing circuitry associated with a core network, CN, configure the CN to perform operations corresponding to any of the methods of the second and/or third aspect.

In the following, a flow diagram 300 of a method embodiment of the present disclosure will be described with reference to FIG. 5C and the application function (AF) 660, network exposure function (NEF) 650, and network data and analytics function (NWDAF) 630 illustrated therein. The NWDAF 630 and NEF 650 may be integral components of a CN. The AF 660 may be operated by a service provider and may be configured to communicate with one or more of the CN components (e.g., via a network such as the Internet). The AF 660 may be configured as an application server hosting, or being otherwise associated with, one or more applications.

The method comprises a step 302 of provisioning by the AF 660, to the NEF 650, communication information related to one or more user equipment, UEs, the communication information including an identifier of an application associated with the AF and an indication of one or more first parameters describing a first UE communication pattern (e.g., an expected or expectable traffic model) associated with the application. The indication may comprise the one or more first parameters themselves (e.g., as type-value information) and/or identifiers thereof.

The method further comprises a step 304 of receiving by the NEF 650, from the AF 660, the communication information related to the one or more user equipment (UEs). As such, the NEF 650 receives the communication information including the identifier of the application associated with the AF 600, and the indication of one or more first parameters describing the first UE communication pattern associated with the application.

The NEF 650 forwards at least some of the information received in step 304 from the AF 660 to the NWDAF 630, either directly or via a proxy. As such, the method also comprises a step 306 of receiving by the NWDAF 630, from the NEF 650, a message comprising the identifier of the application associated with the AF 660 and an indication of the one or more first parameters describing the first UE communication pattern associated with the application and with one or more UEs.

The method also comprises a step 310 of sending, by the AF 660 to the NEF 650, a subscription request, wherein the subscription request includes the identifier of the application. The method further comprises a step 312 of receiving, by the NEF 650 and from the AF 660, the subscription request with the identifier of the application.

The NEF 650 forwards at least some of the information received in step 312 from the AF 660 to the NWDAF 630, either directly or via a proxy. The method thus also comprises a step 314 of receiving, by the NWDAF 630 and from the NEF, the subscription request associated with the AF 660 (i.e., the identifier of the application associated with the AF 660). Then, in step 316, the NWDAF 630 sends, to a user plane function, UPF (not shown), a request for one or more traffic metrics, wherein the request includes the identifier of the application. Optionally, the request may include one or more further parameters received by the NWDAF 630 from the NEF 650 with the subscription request. The NEF 650, in turn, may have received those further parameters from the AF 660 in step 312.

The method further comprises a step 318 of receiving the one or more traffic metrics from the UPF. The UPF may optionally have generated the traffic metrics taking into account the further parameters received from the NWDAF 630 in step 316.

Further still, the method may comprise a step 320 of analyzing by the NWDAF 630 the traffic metrics received in step 318 based at least on the one more first parameters and a step 32 of sending, to the NEF 650, a report indicative of the analysis.

After receipt of the report by the NEF 650, the method comprises a step 324 of sending (e.g., forwarding), by the NEF 650 to the AF 660, a or the report indicative of an analysis of the application traffic by the NWDAF 630 based at least on the one or more first parameters. Further still, the method comprises a step of receiving, by the AF 660 and from the NEF 650, a report indicative of an analysis of traffic of the application based at least on the one or more first parameters.

Exemplary embodiments of the above (e.g., with reference to FIG. 5C) and other aspects described hereinafter include Nnef_AnalyticsExposure service extensions by defining the ueCommInfo element to include a communication pattern obtained by the network operator based on UE user-plane parameters. This information can be obtained from a UPF reporting a detected UE communication pattern (e.g., based on user plane parameters), such as by extending packet forwarding control protocol (PCFP) usage reporting rules (URR) to include such information, and/or by defining a new Nupf_EventExposure service to report the detected communication pattern. Other embodiments include Nnef_ParameterProvision service extension by defining new parameters related to UE communication pattern, such as an expected amount of traffic generated by a particular application associated with an AF.

In other embodiments, an NWDAF can utilize both the AF-provisioned UE communication pattern (e.g., with an expected amount of traffic) and UPF-reported detected UE communication pattern to determine a corresponding model for the UE communication pattern. For example, this determination can be based on machine learning (ML) techniques.

Figure 6:
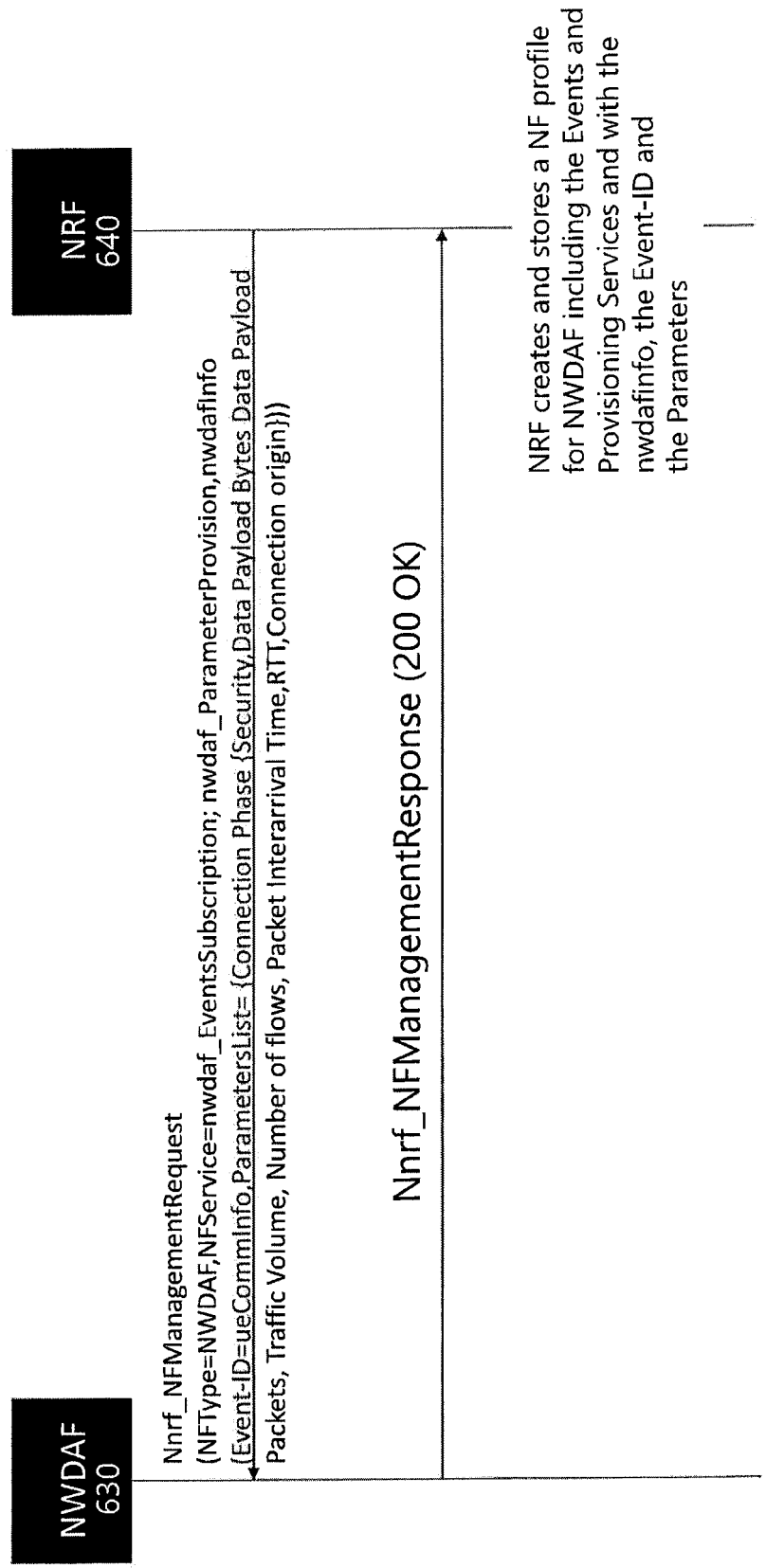
FIG. 6 shows a flow and/or sequence diagram illustrating an exemplary network data and analytics function (NWDAF) registration with a network repository function (NRF) in a 5G core network (5GC), according to various exemplary embodiments of the present disclosure.

In various embodiments, when an NWDAF registers with a network repository function (NRF), the NWDAF can indicate which analytic subtype(s) that it supports. FIG. 6 shows a flow and/or sequence diagram illustrating an exemplary NWDAF registration with an NRF. These entities are labelled 630 and 640, respectively, but for the sake of brevity, they will be referred to without their numerical labels in the following description. Herein, the same reference numerals denote the same or similar components and functions. Furthermore, the numerical labelling of the operations in FIG. 6 is only to facilitate clarity of explanation and does not imply a particular order, unless specifically noted in the following description. In other words, the operations can be performed in different order(s) than the numerical labels, unless specifically noted.

In operation 1, NWDAF registers in NRF by triggering a Nnrf_NFManagement Request including the following information:
  NF to be registered (nfType=NWDAF)
  Service(s) exposed by the NWDAF, e.g.:
    (nfService=Nnwdaf_EventsSubscription)
    (nfService=Nnwdaf_ParameterProvision)
  Analytics supported by the NWDAF:
    Event-ID=ueCommInfo
    ParametersList: all the parameters supported by NWDAF, e.g., security, connection phase, etc., as defined in more detail below.

In operation 2, NRF answers NWDAF with a Nnrf_NF-ManagementResponse message. In operation 3, NRF creates and stores a NF Profile for NWDAF including all the information received in operation 1, specifically the nwdafInfo data structure including Analytic-ID and Analytic-Subtype.

Figure 7A:
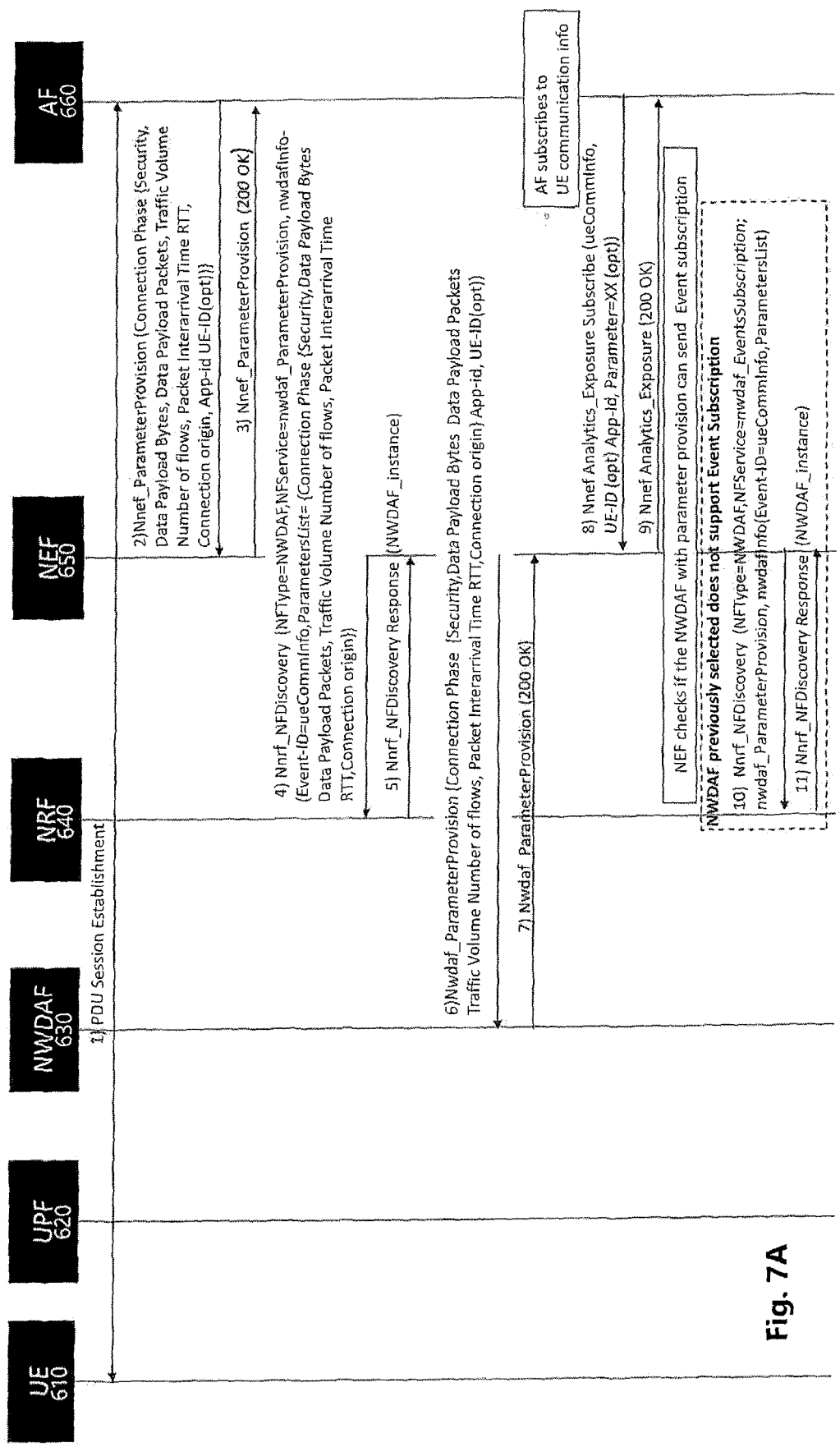
FIGS. 7-9 show flow and/or sequence diagrams illustrating three variants of an exemplary procedure for exchanging UE communication pattern information between an application function (AF) and various network functions (NFs) of a 5GC, according to various exemplary embodiments of the present disclosure.
Figure 7B:
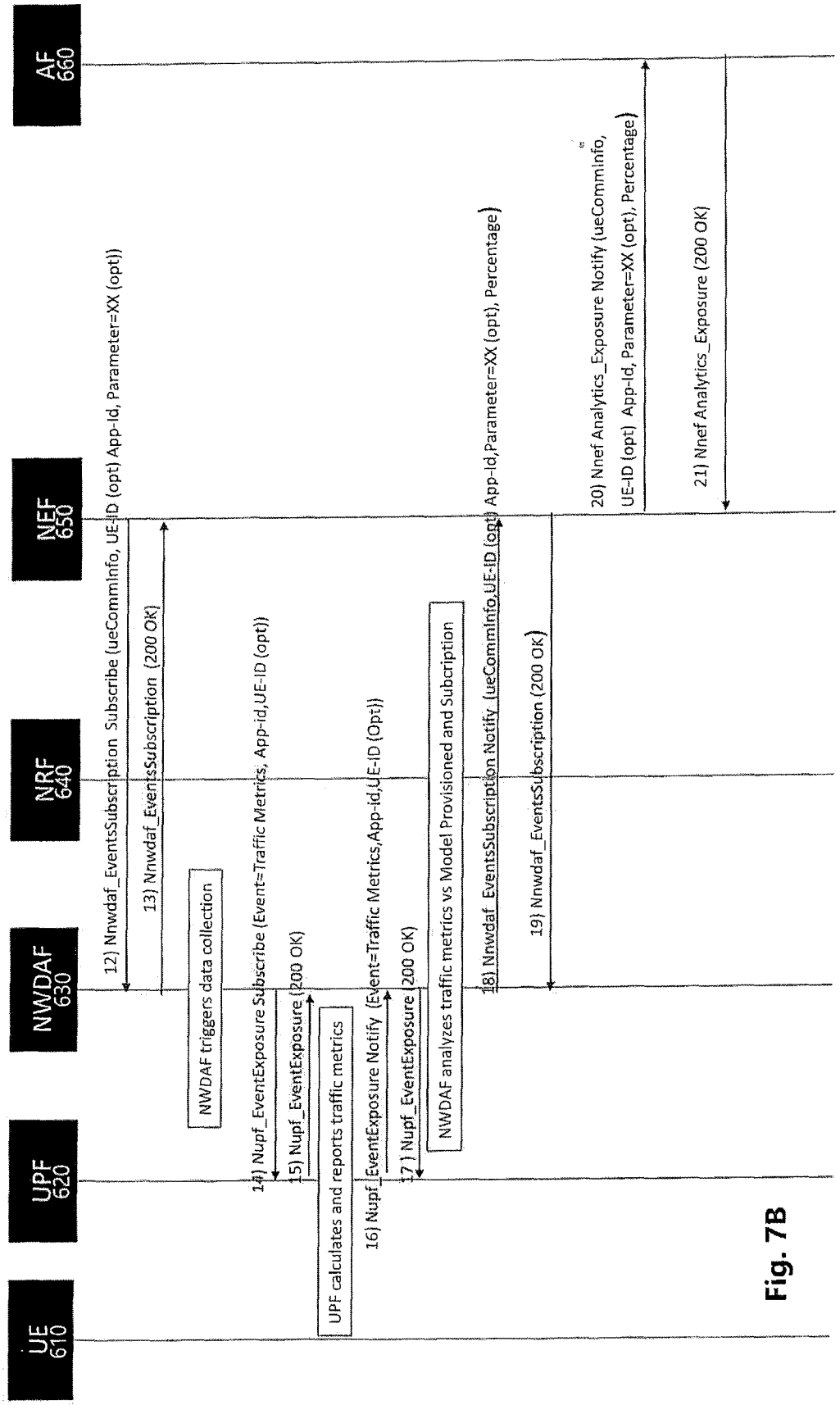
Figure 8A:
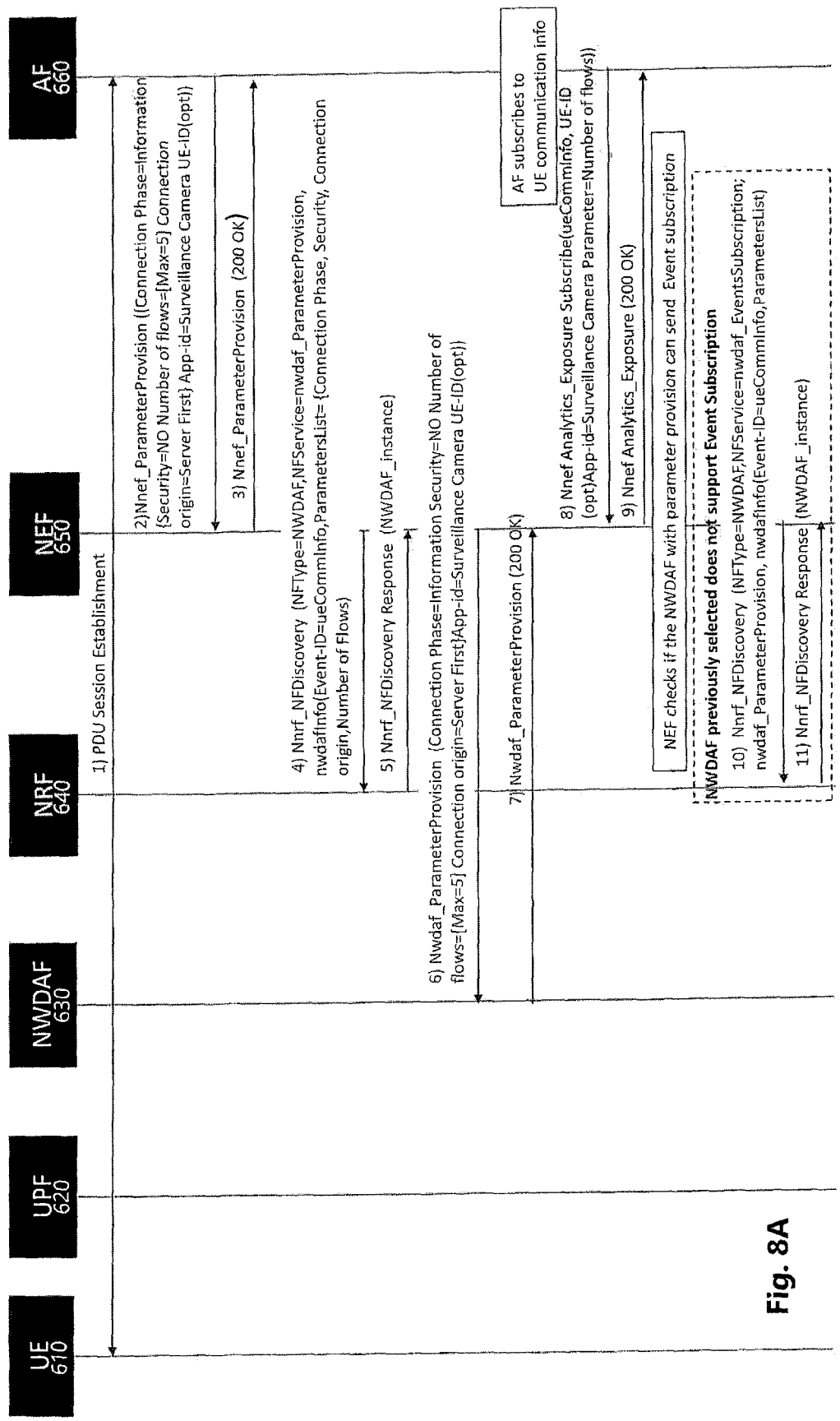
Figure 8B:
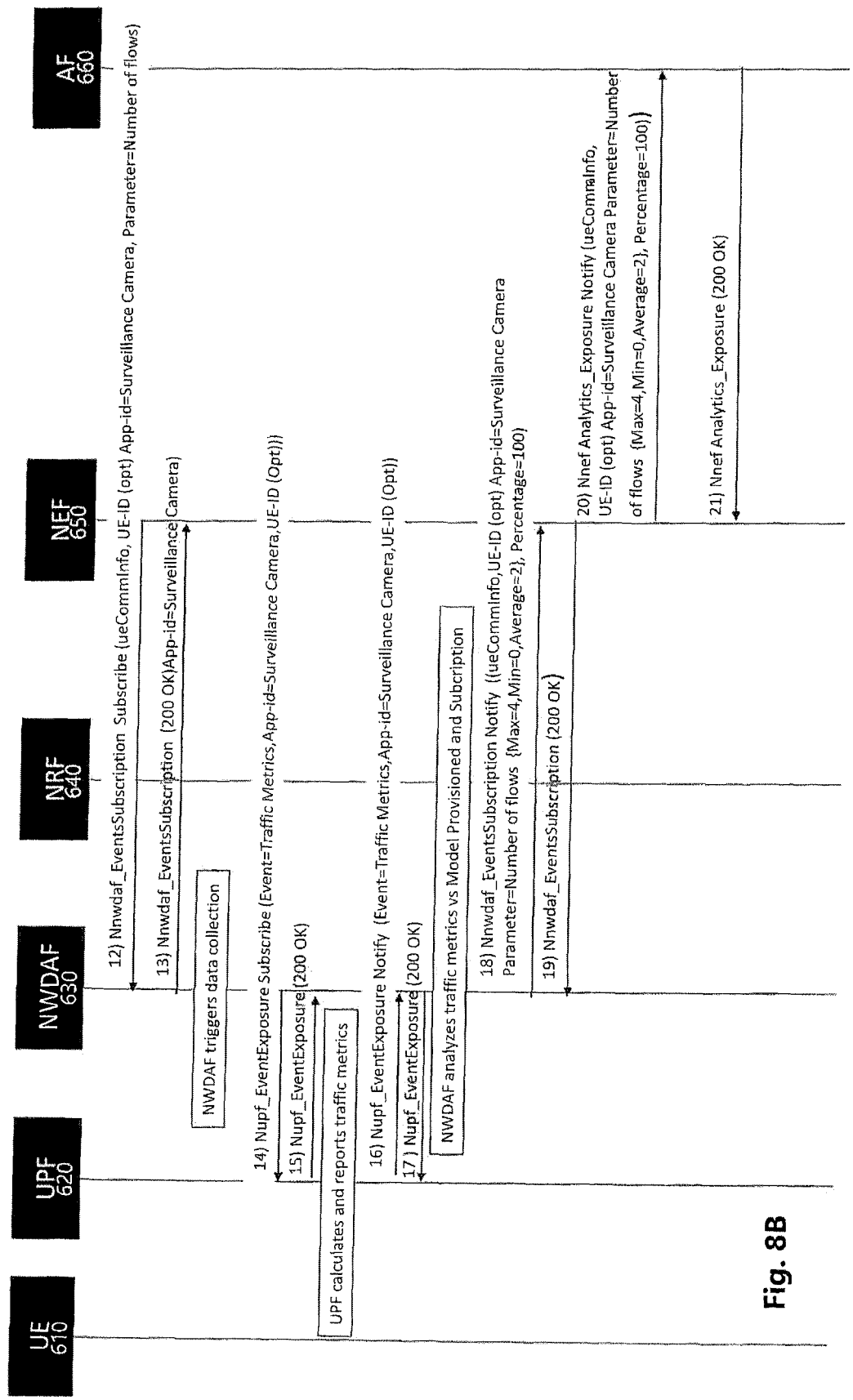
Figure 9A:
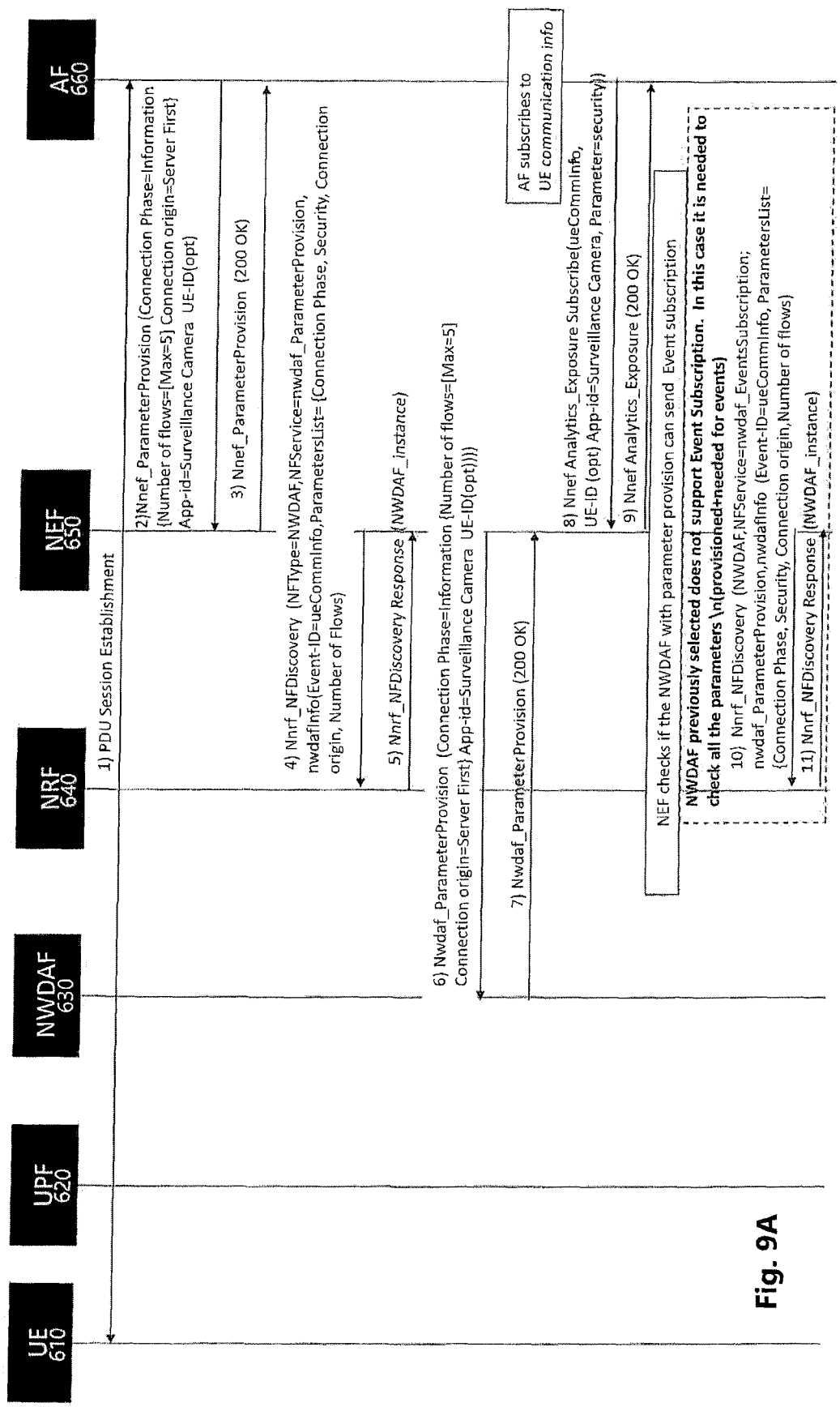
Figure 9B:
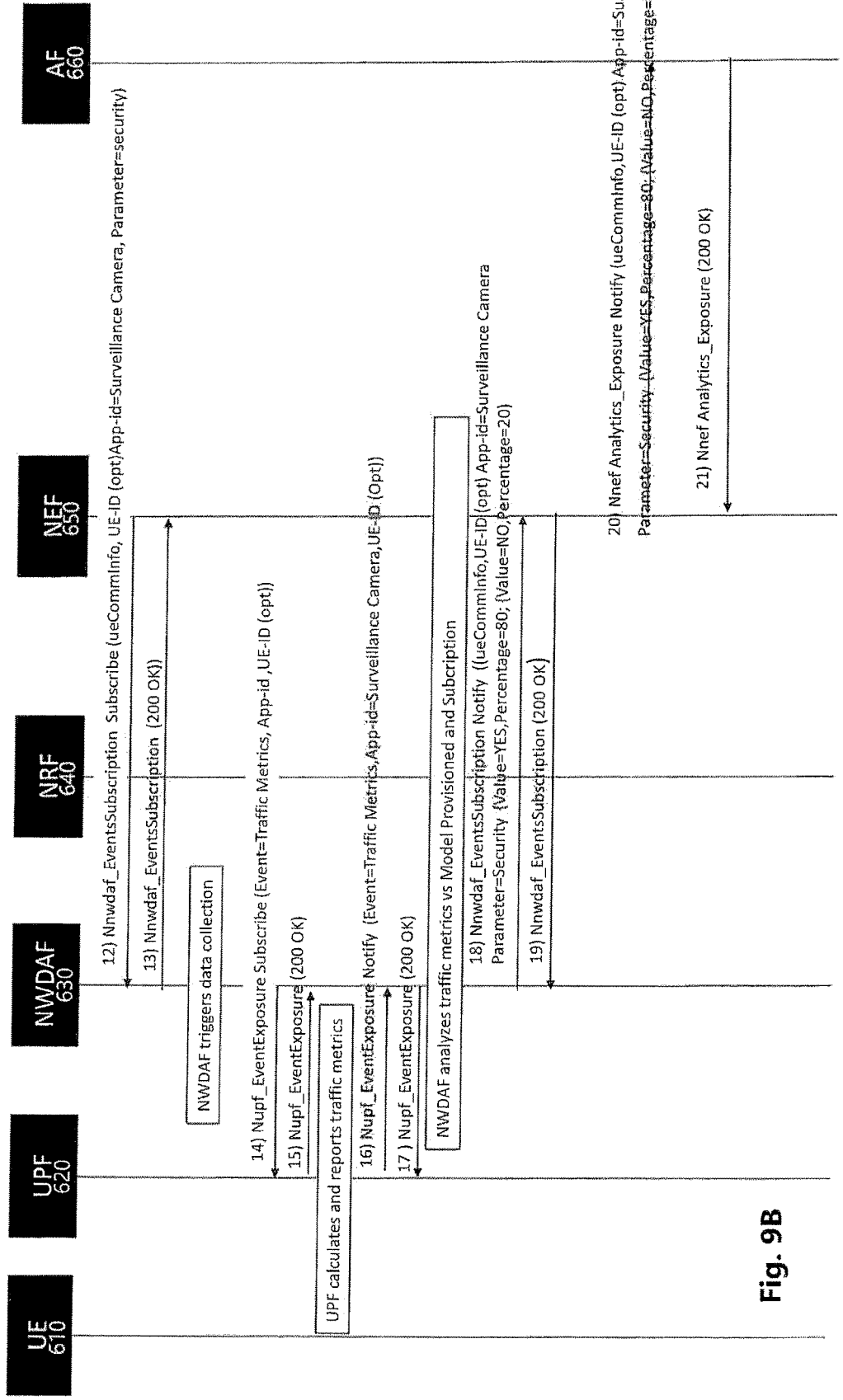

FIG. 7 (collectively denoting FIGS. 7A & B) shows a flow and/or sequence diagram illustrating an exemplary procedure for exchange of UE communication pattern information between an AF and various other NFs of a 5GC. FIG. 8 (collectively denoting FIGS. 8A & B) shows another example in which the AF also subscribes to a notification of a parameter that it provisioned (e.g., in the expected UE communication pattern). FIG. 9 (collectively denoting FIGS. 9A & B) shows another example in which the AF also subscribes to a notification of a parameter that it did not provision. As example, the UE shown in FIGS. 7-9 can be a surveillance camera that detects when there is movement and notifies accordingly.

Figure 5C:
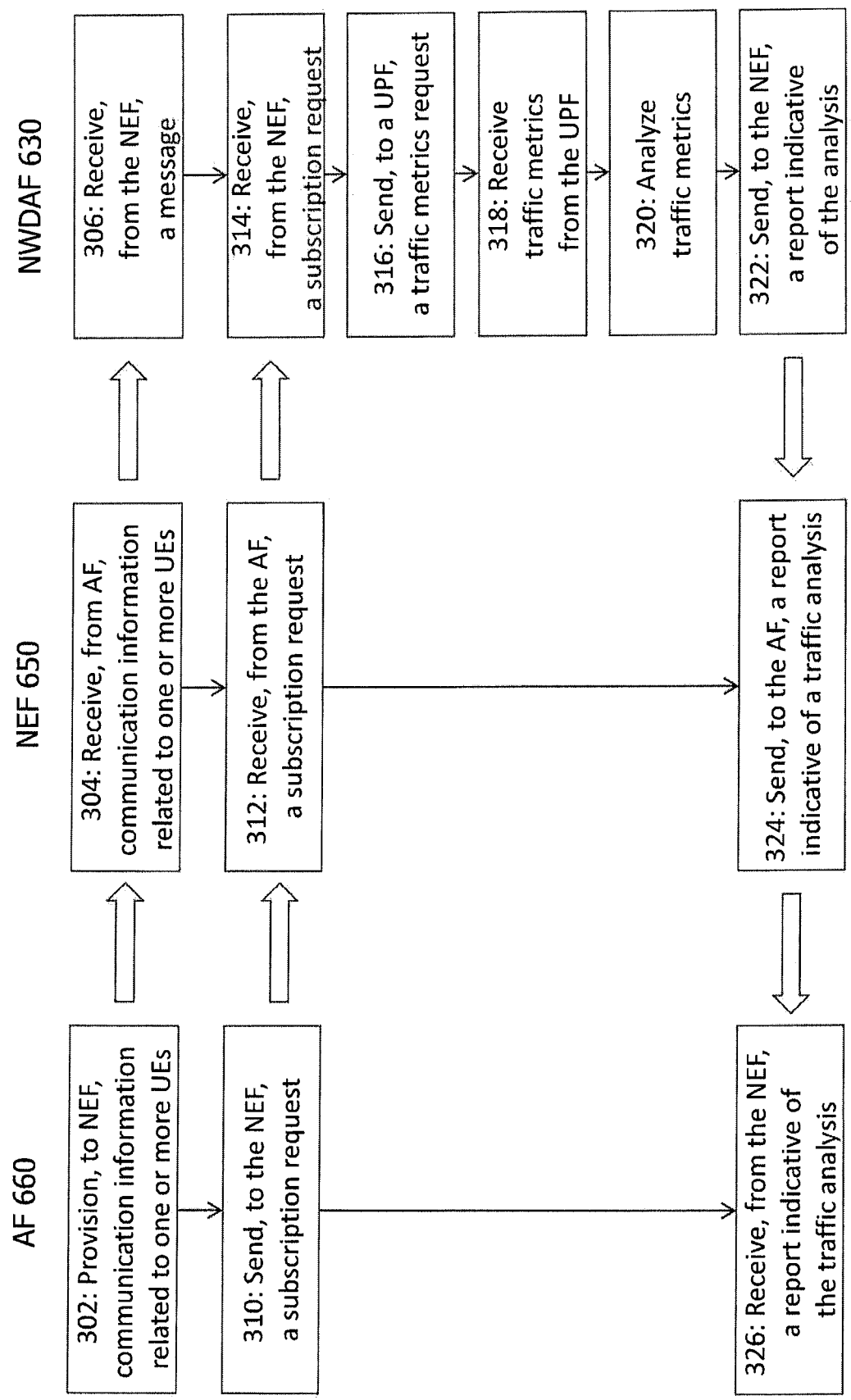
FIG. 5C illustrates exemplary methods and/or procedures performed by an application function (AF), by a network exposure function (NEF), and by a network data and analytics function (NWDAF), according to various exemplary embodiments of the present disclosure.

In FIGS. 7-9, the operations occur between a UE 610, UPF 620, NWDAF 630, NRF 640, NEF 650, and AF 660 (see also FIG. 5C). For example, NWDAF 630 and NRF 640 can be the similarly numbered elements shown in FIG. 6. For the sake of brevity, however, these entities will be referred to without their numerical labels in the following description. Furthermore, the numerical labelling of the operations in FIG. 7 is only to facilitate explanation and does not imply a particular order, unless specifically noted in the following description. In other words, the operations can be performed in different order(s) than the numerical labels, unless specifically noted.

In operation 1, the UE establishes a PDU Session with the AF, according to various known techniques. In operation 2, the AF triggers an Nnef procedure, towards NEF using the Nnef_ParameterProvision service, to provision the UE communication pattern including the IEs comprising CpParameterSet shown in FIG. 5A (see also steps 302 and 304 in FIG. 5C) and the following information as extensions:

- Connection phase [0 . . . N]. Array of communication information parameters, each identifying a phase of the connection between UE and network. For example, a UE does not follow the same communication pattern when it boots up as when a server is updating its firmware for example. It is provided the following phase. The parameters shown in FIG. 5A can be provided for each connection phase. For example, some exemplary phases include:
- Bootstrap: when UE starts the connection
- Client Registration: UE registers in the AF
- Device Management: For example, UE downloads firmware from AF, or AF configures how the device should connect with it.
- Information Reporting: UE sends information to the AF.

For each connection phase, the following additional information can be included as parameters (e.g., as type-value pairs, as identifiers and/or otherwise):
- Security [0 . . . 1]: Boolean value
  - Informs if traffic is encrypted or in clear text. Boolean value.
- Data Payload Bytes [0 . . . 1] It contains the following metrics,
  - expected maximum number of bytes of data per packet
  - expected minimum number of bytes of data per packet
  - expected average number of bytes of data per packet
- Data Payload Packets[0 . . . 1]: It contains the following metrics,
  - expected maximum number of packets
  - expected minimum number of packets
  - expected average number of packets
- Traffic volume [0 . . . 1]: total number of bytes expected.
  - expected maximum number of 5 tuples of the application
  - expected minimum number of 5 tuples of the application
  - expected average number of 5 tuples of the application
- Number of flows[0 . . . 1]: It contains the following metrics,
  - expected maximum number of 5 tuples of the application
  - expected minimum number of 5 tuples of the application
  - expected average number of 5 tuples of the application
- Packet interarrival time [0 . . . 1]:
  - expected maximum time between packets
  - expected minimum time between packets
  - expected average time between packets
- Round Trip Delay [0 . . . 1]:
  - expected end to end delay of the connection
  - expected end to end delay of the connection
  - expected end to end delay of the connection
  - Connection origin[0 . . . 1]: initiator, e.g., client first, server first, or both.
- Identifier of the application of interest (App-ID)
- (optional) Identifier of the UE (UE-ID) or group of IEs.

As an example, in FIG. 8, the AF provisions the following information (no other parameters are provisioned):
- Connection Phase=Information
- Number of Flows: Maximum=5
- Connection Origin=Server first
- Security=NO
- App-ID=surveillance camera.

As another example, in FIG. 9, the AF provisions the following information (no other parameters are provisioned):
- Connection Phase=Information
- Number of Flows: Maximum=5
- Connection Origin=Server first
- App-ID=Surveillance Camera.

In operation 3, the NRF responds with an OK if it supports the provisioned parameters but responds with an error if it does not support the provisioned parameters.

In operation 4, the NEF triggers NWDAF discovery procedure by a Nnrf_NFDiscovery request message to the NRF, including the following information:
- NF to be discovered (nfType=NWDAF)
- service of interest (nfService=Nnwdaf_ParameterProvision)
- analytics of interest:
  - Event-ID=ueCommInfo
  - Parameter-list=Connection Phase, Security, Data Payload Bytes, Data Payload Packets, Traffic Volume, Number of flows, Packet Interarrival Time, RTT, Connection origin.

As an example, in both FIGS. 8-9, NEF asks NRF for a NWDAF capable of provisioning the following parameters:
- Connection Phase
- Number of Flows
- Connection Origin
- Security This example is an optimized way of asking for specific parameters. NEF can ask for more parameters that those provisioned initially (for example all of the parameters).

In operation 5, NRF answers NEF with a Nnrf_NFDiscovery response message including the NWDAF instance. In operation 6, NEF sends the information received in operation 2 to the NWDAF (see also step 306 in FIG. 5C). This includes extensions to the API between NEF and NWDAF to include the App-ID and all the information elements related to the communication parameters (e.g., connection phase, security, data payload bytes, etc.). In operation 7, NWDAF acknowledges this request.

In operation 8, the AF triggers an Nnef procedure towards NEF using the Nnef_AnalyticsExposure service in order to subscribe to information related to the communication of the UE (see also steps 310 and 312 in FIG. 5C). The NEF acknowledges this request in operation 9.

In the message sent in operation 8, the AF can include the following information:
- identifier of the application of interest (App-ID).
- optionally, identifier of the UE (UE-ID). Note the subscription could relate to a single UE or a group of UEs.
- optionally, AF can subscribe to specific parameters of the communication that optionally were included in the provisioning of operation 2. Alternately, if no parameter is included it is considered that AF subscribe to all possible parameters (e.g., exactly or at least the ones sent in operation 2).

For example, in FIG. 8, the AF subscribes to the parameter Number of Flows that it previously provisioned, while in FIG. 9, the AF subscribes to the parameter Security that it did not previously provision.

In operation 10, the NEF queries an NWDAF to see if it supports the requested AF subscription, and receives a positive response in operation 11. Operations 10-11 are optional and only needed if the NWDAF previously selected in operations 6-7 does not support the AF's desired subscription (or if the NEF is not aware of the selected NWDAF's support). For example, it is not needed in FIG. 8 since the subscribed parameter is the same as the provisioned parameter. On the other hand, operation 10-11 may be needed in FIG. 9.

In operation 12, the NEF sends the AF's subscription request (e.g., in operation 8) to the NWDAF (see also step 314 in FIG. 5C). This includes the App-ID parameter, which is an extension to the API between NEF and NWDAF. In operation 13, the NWDAF acknowledges the message from NEF. In operation 14, upon receiving this request, the NWDAF informs the UPF, using the Event Exposure API, that it should provide traffic metrics and/or information for the UE (or group of UEs) associated with the request (see also step 316 in FIG. 5C). This can be identified by the optional UE-ID included in the subscription request, as discussed above.

Also, at or around the same time as sending the message in operation 14, the NWDAF can trigger its analytics and/or data collection logic based on the optional parameters in the subscription request. For example, the NWDAF can trigger data collection from UPF by sending a Nupf_EventExposure Subscribe (HTTP POST) message including:
- event of interest (e.g., event=Traffic Metrics). Based on this event, the UPF will report all the parameters. Optionally, in some scenarios, the NWDAF can indicate to UPF only specific parameters that need to be reported. For example, in FIG. 8, it could indicate Number of Flows, Security, and Connection Origin.
- application of interest (App-ID).
- optionally, identifier of the UE (UE-ID) or group of UEs. As another example, this could be done by extended the existing PDCP URR procedure.

In operation 15, the UPF acknowledges the message in operation 14 with an OK. In operation 16, the UPF begins collecting data and/or determining metrics from user traffic associated with the subscription request. In operation 17, the UPF provides the requested traffic metrics to the NWDAF (see also step 318 in FIG. 5C).

The NWDAF analyzes the traffic metrics provided by the UPF and compares with attributes of the model provisioned in operation 4 (see also step 320 in FIG. 5C). In operation 18, the NWDAF provides UE communication information to the NEF according to the AF's subscription (see also step 322 in FIG. 5C). For example, if AF subscribes to specific parameters of the UE communication, NWDAF sends the corresponding information related to those parameters. On the other hand, if AF has subscribed to the UE communication information without specifying any parameters, NWDAF can include all relevant parameters. In operation 19, the NEF acknowledges the message received in operation 18. In operation 20, the NEF forwards the information received from NWDAF to the subscribing AF, and in operation 21, the AF acknowledges the message received in operation 20 (see also steps 324 and 326 in FIG. 5C).

As an example, in FIG. 8, AF has subscribed to the Number of flows parameter. Accordingly, NWDAF analyses the traffic against the following characteristics:
- Connection Phase=Information
- Maximum Number of Flows=5
- Connection Origin=Server first
- Security=NO Since the AF has subscribed to the Number of flows parameter, the NWDAF will send the following information in operation 18:
- Number of flows: Max=4, Min=0, Average=2.
- Percentage=100%

In this case, the percentage means that 100% of traffic analyzed by UPF matches the characteristics.

As another example, in FIG. 9, AF has subscribed to the Security parameter. Accordingly, NWDAF analyses the traffic against the following characteristics:
- Connection Phase=Information
- Maximum Number of Flows=5
- Connection Origin=Server first Since the AF has subscribed to the Security parameter, the NWDAF will send the following information in operation 18:
- Security=Yes.
- Percentage=80%

In this case, the percentage means that 80% of traffic analyzed by UPF matches the characteristics.

The embodiments described above are further illustrated by the exemplary methods and/or procedures shown in FIGS. 10-12, described below. For example, features of various embodiments discussed above are included in various operations of the exemplary methods and/or procedures shown in FIGS. 10-12. Those embodiments can be combined with the embodiments of FIG. 5C.

Figure 10:
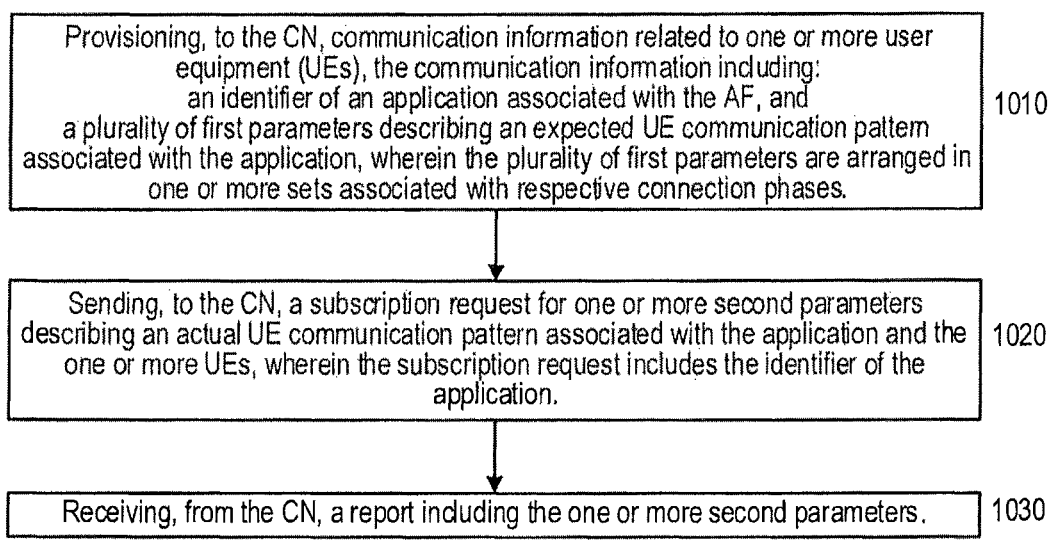
FIG. 10 illustrates an exemplary method and/or procedure performed by an application function (AF), according to various exemplary embodiments of the present disclosure.

More specifically, FIG. 10 illustrates an exemplary method and/or procedure for exchanging UE communication pattern information with a core network (CN), according to various exemplary embodiments of the present disclosure. The exemplary method and/or procedure shown in FIG. 10 can be performed by an application function (AF, e.g., an application server) associated with an application internal to, or external from, the CN. Although the exemplary method and/or procedure is illustrated in FIG. 10 by specific blocks in a particular order, the operations corresponding to the blocks can be performed in different orders than shown and can be combined and/or divided into blocks and/or operations having different functionality than shown. Furthermore, the exemplary method and/or procedure shown in FIG. 10 can be complementary to other exemplary methods and/or procedures disclosed herein (e.g., FIGS. 6-9, 11-12), such that they are capable of being used cooperatively to provide benefits, advantages, and/or solutions to problems described herein. Optional blocks and/or operations are indicated by dashed lines.

The exemplary method and/or procedure can include the operations of block 1010, in which the AF can provision, to the CN, communication information related to one or more user equipment (UEs). The communication information can include an identifier of an application associated with the AF, and a plurality of first parameters describing an expected UE communication pattern associated with the application. The plurality of first parameters can be arranged in one or more sets associated with respective connection phases. For example, this operation can correspond to operation 4 shown in FIGS. 7-9.

In some embodiments, each set of first parameters can be associated with one of the following connection phases: bootstrap, registration, device management, and information reporting. In some embodiments, each set of first parameters can include one or more of the following first parameters: security, data packet size, number of data packets, traffic volume, number of flows, packet interarrival time, packet round trip delay, and connection origin. In some embodiments, at least one of the first parameters includes one or more of the following: a maximum value, a minimum value, and an average value.

The exemplary method and/or procedure can include the operations of block 1020, in which the AF can send, to the CN, a subscription request for one or more second parameters describing an actual UE communication pattern associated with the application and the one or more UEs. The subscription request can include the identifier of the application, e.g., also provisioned in block 1010. In some embodiments, the subscription request can also include identifiers of the one or more second parameters. In some embodiments, the one or more second parameters are included in the one or more first parameters (e.g., as illustrated in FIG. 8), while in other embodiments, the one or more second parameters include at least one parameter not included in the one or more first parameters (e.g., as illustrated in FIG. 9).

The exemplary method and/or procedure can also include the operations of block 1030, in which the AF can receive, from the CN, a report including the one or more second parameters. In some embodiments, the report includes second parameters that are associated with a particular connection phase that is also associated with a particular set of the first parameters. For example, the report can include second parameters associated with an "information" connection phase, such as illustrated in FIGS. 8-9.

Figure 11:
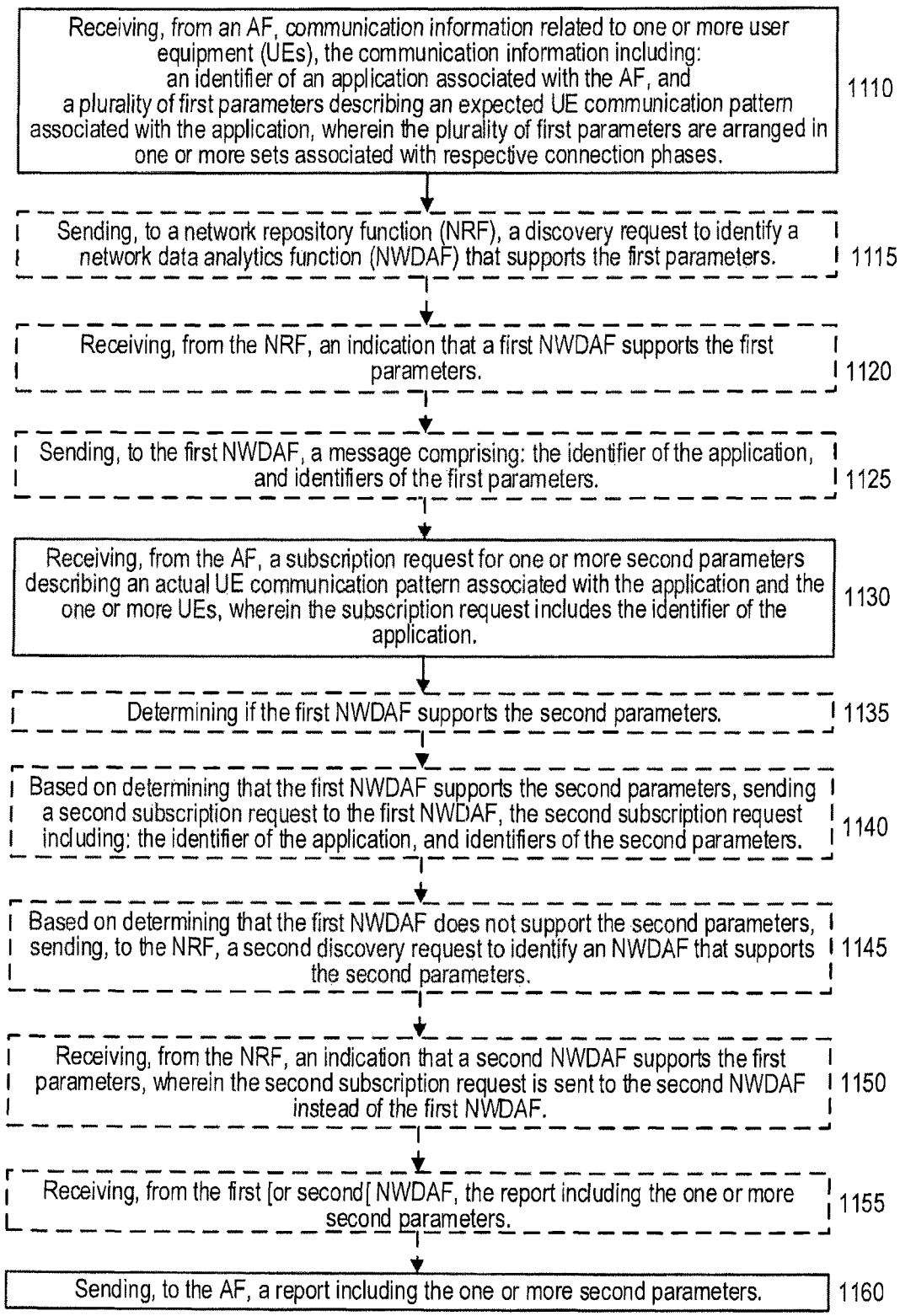
FIG. 11 illustrates an exemplary method and/or procedure performed by a network exposure function (NEF), according to various exemplary embodiments of the present disclosure.

In addition, FIG. 11 illustrates another exemplary method and/or procedure for exchanging UE communication pattern information with an application function (AF), according to various exemplary embodiments of the present disclosure. The exemplary method and/or procedure shown in FIG. 11 can be performed by a network exposure function (NEF) in a 5GC, such as described herein. Although the exemplary method and/or procedure is illustrated in FIG. 11 by specific blocks in a particular order, the operations corresponding to the blocks can be performed in different orders than shown and can be combined and/or divided into blocks and/or operations having different functionality than shown. Furthermore, the exemplary method and/or procedure shown in FIG. 11 can be complementary to other exemplary methods and/or procedures disclosed herein (e.g., FIGS. 6-10, 12), such that they are capable of being used cooperatively to provide benefits, advantages, and/or solutions to problems described herein. Optional blocks and/or operations are indicated by dashed lines.

The exemplary method and/or procedure can include the operations of block 1110, where the NEF can receive, from the AF, communication information related to one or more user equipment (UEs). The communication information can include an identifier of an application associated with the AF, and a plurality of first parameters describing an expected UE communication pattern associated with the application. The plurality of first parameters can be arranged in one or more sets associated with respective connection phases. For example, this operation can correspond to operation 4 shown in FIGS. 7-9.

In some embodiments, each set of first parameters can be associated with one of the following connection phases: bootstrap, registration, device management, and information reporting. In some embodiments, each set of first parameters can include one or more of the following first parameters: security, data packet size, number of data packets, traffic volume, number of flows, packet interarrival time, packet round trip delay, and connection origin. In some embodiments, at least one of the first parameters includes one or more of the following: a maximum value, a minimum value, and an average value.

In some embodiments, the exemplary method and/or procedure can also include the operations of blocks 1115-1125. In block 1115, the NEF can send, to a network repository function (NRF) a discovery request to identify a network data analytics function (NWDAF) that supports the first parameters. In block 1120, the NEF can receive, from the NRF, an indication that a first NWDAF supports the first parameters. In block 1125, the NEF can send, to the first NWDAF, a message comprising: the identifier of the application, and identifiers of the first parameters.

The exemplary method and/or procedure can also include the operations of block 1130, in which the NEF can receive, from the AF, a subscription request for one or more second parameters describing an actual UE communication pattern associated with the application and the one or more UEs. The subscription request can include the identifier of the application, e.g., also received in block 1110. In some embodiments, the subscription request can also include identifiers of the one or more second parameters. In some embodiments, the one or more second parameters are included in the one or more first parameters (e.g., as illustrated in FIG. 8), while in other embodiments, the one or more second parameters include at least one parameter not included in the one or more first parameters (e.g., as illustrated in FIG. 9).

In some embodiments, the exemplary method and/or procedure can also include some or all of the operations of blocks 1135-1155. In block 1135, the NEF can determine if the first NWDAF supports the second parameters. In block 1140, based on determining that the first NWDAF supports the second parameters, the NEF can send a second subscription request to the first NWDAF. The second subscription request can include the identifier of the application and identifiers of the second parameters.

On the other hand, in block 1145, based on determining (e.g., in block 1135) that the first NWDAF does not support the second parameters, the NEF can send, to the NRF, a second discovery request to identify an NWDAF that supports the second parameters. In block 1150, the NEF can receive, from the NRF, an indication that a second NWDAF supports the second parameters. In such case, the NEF can send the second subscription request (e.g., in block 1140) to the second NWDAF rather than the first NWDAF. In block 1155, the NEF can receive the report including the one or more second parameters. The report can be received from the first NWDAF or the second NWDAF (i.e., the NWDAF to which the second subscription request was sent), which in turn depends on the result of the determination in block 1135.

The exemplary method and/or procedure can also include the operations of block 1160, in which the NEF can send, to the AF, the report including the one or more second parameters. In some embodiments, the report includes second parameters that are associated with a particular connection phase that is also associated with a particular set of the first parameters. For example, the report can include second parameters associated with an "information" connection phase, such as illustrated in FIGS. 8-9.

Figure 12:
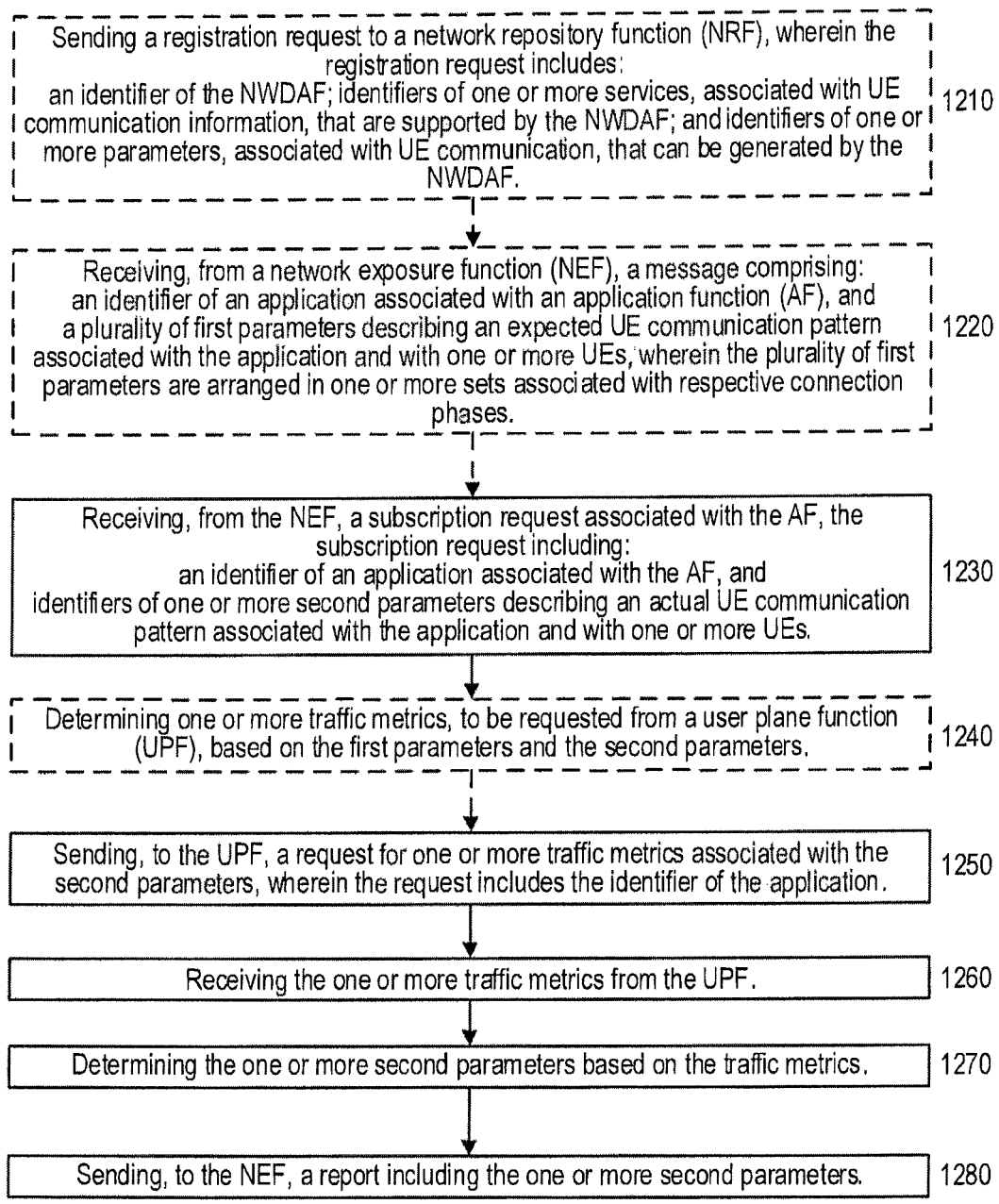
FIG. 12 illustrates an exemplary method and/or procedure performed by a network data and analytics function (NWDAF), according to various exemplary embodiments of the present disclosure.

In addition, FIG. 12 illustrates another exemplary method and/or procedure for exchanging UE communication pattern information with an application function (AF), according to various exemplary embodiments of the present disclosure. The exemplary method and/or procedure shown in FIG. 12 can be performed by a network data analytics function (NWDAF) in a 5GC, such as described herein. Although the exemplary method and/or procedure is illustrated in FIG. 12 by specific blocks in a particular order, the operations corresponding to the blocks can be performed in different orders than shown and can be combined and/or divided into blocks and/or operations having different functionality than shown. Furthermore, the exemplary method and/or procedure shown in FIG. 12 can be complementary to other exemplary methods and/or procedures disclosed herein (e.g., FIGS. 6-11), such that they are capable of being used cooperatively to provide benefits, advantages, and/or solutions to problems described herein. Optional blocks and/or operations are indicated by dashed lines.

In some embodiments, the exemplary method and/or procedure can include the operations of block 1210, where the NWDAF can send a registration request to a network repository function (NRF) in the CN. The registration request can include an identifier of the NWDAF; identifiers of one or more services, associated with UE communication information, that are supported by the NWDAF; and identifiers of one or more parameters, associated with UE communication, that can be generated by the NWDAF. For example, the registration request sent in block 1210 can correspond to operation 1 in FIG. 6.

In some embodiments, the exemplary method and/or procedure can also include the operations of block 1220, where the NWDAF can receive, from a network exposure function (NEF), a message comprising an identifier of an application associated with an application function (AF), and a plurality of first parameters describing an expected UE communication pattern associated with the application and with one or more UEs. The plurality of first parameters can be arranged in one or more sets associated with respective connection phases. For example, this operation can correspond to operation 6 shown in FIGS. 7-9.

In some embodiments, each set of first parameters can be associated with one of the following connection phases: bootstrap, registration, device management, and information reporting. In some embodiments, each set of first parameters can include one or more of the following first parameters: security, data packet size, number of data packets, traffic volume, number of flows, packet interarrival time, packet round trip delay, and connection origin. In some embodiments, at least one of the first parameters includes one or more of the following: a maximum value, a minimum value, and an average value.

The exemplary method and/or procedure can also include the operations of block 1230, where the NWDAF can receive, from the NEF, a subscription request associated with the AF. The subscription request can include an identifier of an application associated with the AF, and identifiers of one or more second parameters describing an actual UE communication pattern associated with the application and with one or more UEs. For example, these operations can correspond to operation 12 in FIGS. 7-9.

In some embodiments, the one or more second parameters are included in the one or more first parameters (e.g., as illustrated in FIG. 8), while in other embodiments, the one or more second parameters include at least one parameter not included in the one or more first parameters (e.g., as illustrated in FIG. 9).

The exemplary method and/or procedure can also include the operations of block 1250, where the NWDAF can send, to a user plane function (UPF), a request for one or more traffic metrics associated with the second parameters. The request can include the identifier of the application. For example, these operations can correspond to operation 14 shown in FIGS. 7-9. In some embodiments, the exemplary method and/or procedure can also include the operations of block 1240, where the NWDAF can determine the one or more traffic metrics, to be requested from the UPF, based on the first parameters (e.g., received in block 1220) and the second parameters (e.g., received in block 1230).

The exemplary method and/or procedure can also include the operations of block 1260, where the NWDAF can receive the one or more traffic metrics from the UPF. The exemplary method and/or procedure can also include the operations of block 1270, where the NWDAF can determine the one or more second parameters based on the traffic metrics, and block 1280, where the NWDAF can send, to the NEF, a report including the one or more second parameters. For example, these operations can correspond to operations 16-18 shown in FIGS. 7-9.

Figure 13:
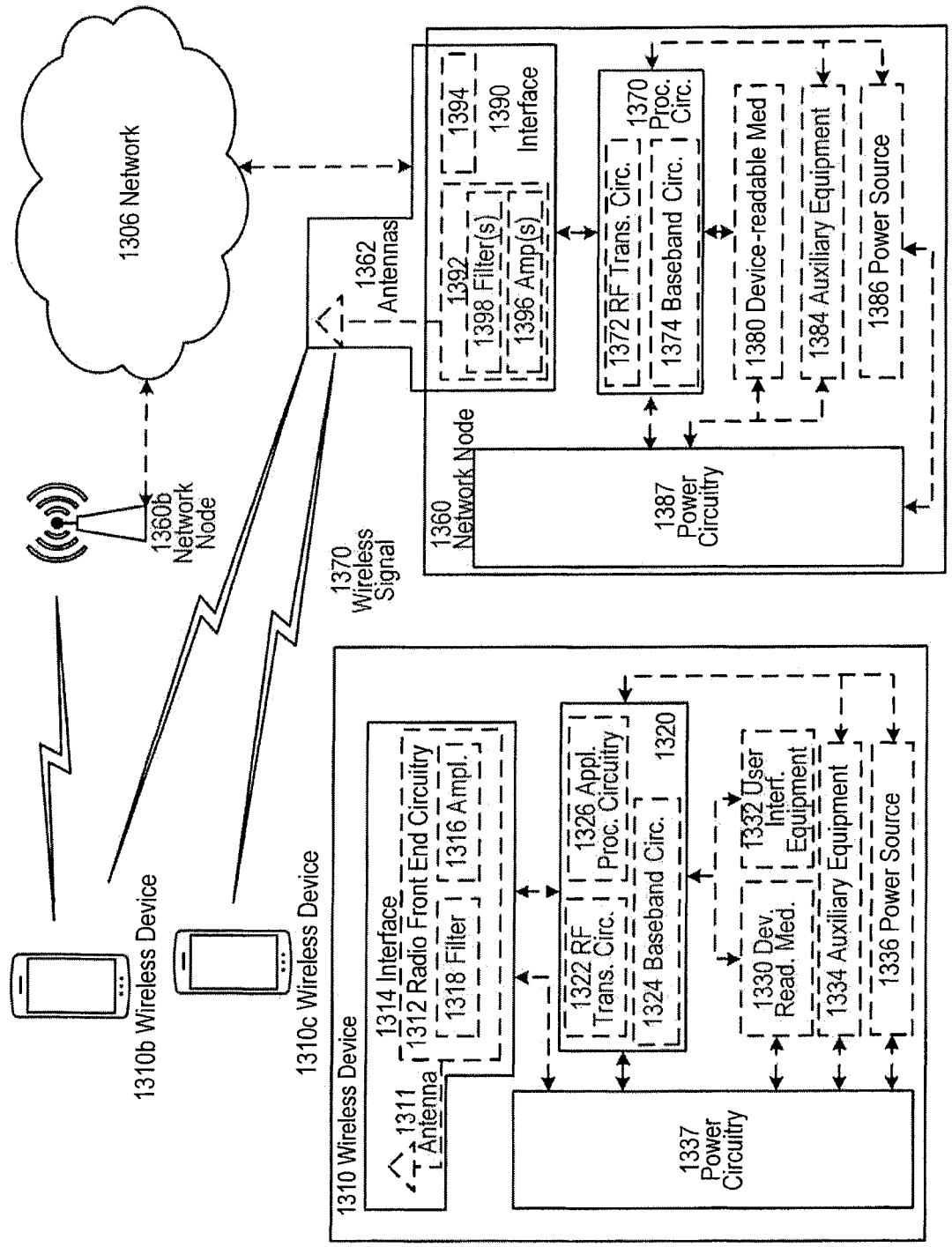
FIG. 13 illustrates an exemplary embodiment of a wireless network, according to various exemplary embodiments of the present disclosure.

Although the subject matter described herein can be implemented in any appropriate type of system using any suitable components, the embodiments disclosed herein are described in relation to a wireless network, such as the example wireless network illustrated in FIG. 13. For simplicity, the wireless network of FIG. 13 only depicts network 1306, network nodes 1360 and 1360*b*, and WDs 1310, 1310*b*, and 1310*c*. In practice, a wireless network can further include any additional elements suitable to support communication between wireless devices or between a wireless device and another communication device, such as a landline telephone, a service provider, or any other network node or end device. Of the illustrated components, network node 1360 and wireless device (WD) 1310 are depicted with additional detail. The wireless network can provide communication and other types of services to one or more wireless devices to facilitate the wireless devices' access to and/or use of the services provided by, or via, the wireless network.

The wireless network can comprise and/or interface with any type of communication, telecommunication, data, cellular, and/or radio network or other similar type of system. In some embodiments, the wireless network can be configured to operate according to specific standards or other types of predefined rules or procedures. Thus, particular embodiments of the wireless network can implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 1306 can comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 1360 and WD 1310 comprise various components described in more detail below. These components work together in order to provide network node and/or wireless device functionality, such as providing wireless connections in a wireless network. In different embodiments, the wireless network can comprise any number of wired or wireless networks, network nodes, base stations, controllers, wireless devices, relay stations, and/or any other components or systems that can facilitate or participate in the communication of data and/or signals whether via wired or wireless connections.

Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations can be categorized based on the amount of coverage they provide (or, stated differently, they transmit power level) and can then also be referred to as femto base stations, pico base stations, micro base stations, or macro base stations. A base station can be a relay node or a relay donor node controlling a relay. A network node can also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station can also be referred to as nodes in a distributed antenna system (DAS).

Further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node can be a virtual network node as described in more detail below.

In FIG. 13, network node 1360 includes processing circuitry 1370, device readable medium 1380, interface 1390, auxiliary equipment 1384, power source 1386, power circuitry 1387, and antenna 1362. Although network node 1360 illustrated in the example wireless network of FIG. 13 can represent a device that includes the illustrated combination of hardware components, other embodiments can comprise network nodes with different combinations of components. It is to be understood that a network node comprises any suitable combination of hardware and/or software needed to perform the tasks, features, functions and methods and/or procedures disclosed herein. Moreover, while the components of network node 1360 are depicted as single boxes located within a larger box, or nested within multiple boxes, in practice, a network node can comprise multiple different physical components that make up a single illustrated component (e.g., device readable medium 1380 can comprise multiple separate hard drives as well as multiple RAM modules).

Similarly, network node 1360 can be composed of multiple physically separate components (e.g., a NodeB component and an RNC component, or a BTS component and a BSC component, etc.), which can each have their own respective components. In certain scenarios in which network node 1360 comprises multiple separate components (e.g., BTS and BSC components), one or more of the separate components can be shared among several network nodes. For example, a single RNC can control multiple NodeB's. In such a scenario, each unique NodeB and RNC pair, can in some instances be considered a single separate network node. In some embodiments, network node 1360 can be configured to support multiple radio access technologies (RATs). In such embodiments, some components can be duplicated (e.g., separate device readable medium 1380 for the different RATs) and some components can be reused (e.g., the same antenna 1362 can be shared by the RATs). Network node 1360 can also include multiple sets of the various illustrated components for different wireless technologies integrated into network node 1360, such as, for example, GSM, WCDMA, LTE, NR, WiFi, or Bluetooth wireless technologies. These wireless technologies can be integrated into the same or different chip or set of chips and other components within network node 1360.

Processing circuitry 1370 can be configured to perform any determining, calculating, or similar operations (e.g., certain obtaining operations) described herein as being provided by a network node. These operations performed by processing circuitry 1370 can include processing information obtained by processing circuitry 1370 by, for example, converting the obtained information into other information, comparing the obtained information or converted information to information stored in the network node, and/or performing one or more operations based on the obtained information or converted information, and as a result of said processing making a determination.

Processing circuitry 1370 can comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 1360 components, such as device readable medium 1380, network node 1360 functionality. For example, processing circuitry 1370 can execute instructions stored in device readable medium 1380 or in memory within processing circuitry 1370. Such functionality can include providing any of the various wireless features, functions, or benefits discussed herein. In some embodiments, processing circuitry 1370 can include a system on a chip (SOC).

In some embodiments, processing circuitry 1370 can include one or more of radio frequency (RF) transceiver circuitry 1372 and baseband processing circuitry 1374. In some embodiments, radio frequency (RF) transceiver circuitry 1372 and baseband processing circuitry 1374 can be on separate chips (or sets of chips), boards, or units, such as radio units and digital units. In alternative embodiments, part or all of RF transceiver circuitry 1372 and baseband processing circuitry 1374 can be on the same chip or set of chips, boards, or units In certain embodiments, some or all of the functionality described herein as being provided by a network node, base station, eNB or other such network device can be performed by processing circuitry 1370 executing instructions stored on device readable medium 1380 or memory within processing circuitry 1370. In alternative embodiments, some or all of the functionality can be provided by processing circuitry 1370 without executing instructions stored on a separate or discrete device readable medium, such as in a hard-wired manner. In any of those embodiments, whether executing instructions stored on a device readable storage medium or not, processing circuitry 1370 can be configured to perform the described functionality. The benefits provided by such functionality are not limited to processing circuitry 1370 alone or to other components of network node 1360, but are enjoyed by network node 1360 as a whole, and/or by end users and the wireless network generally.

Device readable medium 1380 can comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that can be used by processing circuitry 1370. Device readable medium 1380 can store any suitable instructions, data or information, including a computer program, software, an application including one or more of logic, rules, code, tables, etc. and/or other instructions capable of being executed by processing circuitry 1370 and, utilized by network node 1360. Device readable medium 1380 can be used to store any calculations made by processing circuitry 1370 and/or any data received via interface 1390. In some embodiments, processing circuitry 1370 and device readable medium 1380 can be considered to be integrated.

Interface 1390 is used in the wired or wireless communication of signaling and/or data between network node 1360, network 1306, and/or WDs 1310. As illustrated, interface 1390 comprises port(s)/terminal(s) 1394 to send and receive data, for example to and from network 1306 over a wired connection. Interface 1390 also includes radio front end circuitry 1392 that can be coupled to, or in certain embodiments a part of, antenna 1362. Radio front end circuitry 1392 comprises filters 1398 and amplifiers 1396. Radio front end circuitry 1392 can be connected to antenna 1362 and processing circuitry 1370. Radio front end circuitry can be configured to condition signals communicated between antenna 1362 and processing circuitry 1370. Radio front end circuitry 1392 can receive digital data that is to be sent out to other network nodes or WDs via a wireless connection. Radio front end circuitry 1392 can convert the digital data into a radio signal having the appropriate channel and bandwidth parameters using a combination of filters 1398 and/or amplifiers 1396. The radio signal can then be transmitted via antenna 1362. Similarly, when receiving data, antenna 1362 can collect radio signals which are then converted into digital data by radio front end circuitry 1392. The digital data can be passed to processing circuitry 1370. In other embodiments, the interface can comprise different components and/or different combinations of components.

In certain alternative embodiments, network node 1360 may not include separate radio front end circuitry 1392, instead, processing circuitry 1370 can comprise radio front end circuitry and can be connected to antenna 1362 without separate radio front end circuitry 1392. Similarly, in some embodiments, all or some of RF transceiver circuitry 1372 can be considered a part of interface 1390. In still other embodiments, interface 1390 can include one or more ports or terminals 1394, radio front end circuitry 1392, and RF transceiver circuitry 1372, as part of a radio unit (not shown), and interface 1390 can communicate with baseband processing circuitry 1374, which is part of a digital unit (not shown).

Antenna 1362 can include one or more antennas, or antenna arrays, configured to send and/or receive wireless signals. Antenna 1362 can be coupled to radio front end circuitry 1390 and can be any type of antenna capable of transmitting and receiving data and/or signals wirelessly. In some embodiments, antenna 1362 can comprise one or more omni-directional, sector or panel antennas operable to transmit/receive radio signals between, for example, 2 GHz and 66 GHz. An omni-directional antenna can be used to transmit/receive radio signals in any direction, a sector antenna can be used to transmit/receive radio signals from devices within a particular area, and a panel antenna can be a line of sight antenna used to transmit/receive radio signals in a relatively straight line. In some instances, the use of more than one antenna can be referred to as MIMO. In certain embodiments, antenna 1362 can be separate from network node 1360 and can be connectable to network node 1360 through an interface or port.

Antenna 1362, interface 1390, and/or processing circuitry 1370 can be configured to perform any receiving operations and/or certain obtaining operations described herein as being performed by a network node. Any information, data and/or signals can be received from a wireless device, another network node and/or any other network equipment. Similarly, antenna 1362, interface 1390, and/or processing circuitry 1370 can be configured to perform any transmitting operations described herein as being performed by a network node. Any information, data and/or signals can be transmitted to a wireless device, another network node and/or any other network equipment.

Power circuitry 1387 can comprise, or be coupled to, power management circuitry and can be configured to supply the components of network node 1360 with power for performing the functionality described herein. Power circuitry 1387 can receive power from power source 1386. Power source 1386 and/or power circuitry 1387 can be configured to provide power to the various components of network node 1360 in a form suitable for the respective components (e.g., at a voltage and current level needed for each respective component). Power source 1386 can either be included in, or external to, power circuitry 1387 and/or network node 1360. For example, network node 1360 can be connectable to an external power source (e.g., an electricity outlet) via an input circuitry or interface such as an electrical cable, whereby the external power source supplies power to power circuitry 1387. As a further example, power source 1386 can comprise a source of power in the form of a battery or battery pack which is connected to, or integrated in, power circuitry 1387. The battery can provide backup power should the external power source fail. Other types of power sources, such as photovoltaic devices, can also be used.

Alternative embodiments of network node 1360 can include additional components beyond those shown in FIG. 13 that can be responsible for providing certain aspects of the network node's functionality, including any of the functionality described herein and/or any functionality necessary to support the subject matter described herein. For example, network node 1360 can include user interface equipment to allow and/or facilitate input of information into network node 1360 and to allow and/or facilitate output of information from network node 1360. This can allow and/or facilitate a user to perform diagnostic, maintenance, repair, and other administrative functions for network node 1360.

In some embodiments, a wireless device (WD, e.g., WD 1310) can be configured to transmit and/or receive information without direct human interaction. For instance, a WD can be designed to transmit information to a network on a predetermined schedule, when triggered by an internal or external event, or in response to requests from the network. Examples of a WD include, but are not limited to, smart phones, mobile phones, cell phones, voice over IP (VoIP) phones, wireless local loop phones, desktop computers, personal digital assistants (PDAs), wireless cameras, gaming consoles or devices, music storage devices, playback appliances, wearable devices, wireless endpoints, mobile stations, tablets, laptops, laptop-embedded equipment (LEE), laptop-mounted equipment (LME), smart devices, wireless customer-premise equipment (CPE), mobile-type communication (MTC) devices, Internet-of-Things (IoT) devices, vehicle-mounted wireless terminal devices, etc. A WD can support device-to-device (D2D) communication, for example by implementing a 3GPP standard for sidelink communication, vehicle-to-vehicle (V2V), vehicle-to-infrastructure (V2I), vehicle-to-everything (V2X) and can in this case be referred to as a D2D communication device. As yet another specific example, in an Internet of Things (IoT) scenario, a WD can represent a machine or other device that performs monitoring and/or measurements, and transmits the results of such monitoring and/or measurements to another WD and/or a network node. The WD can in this case be a machine-to-machine (M2M) device, which can in a 3GPP context be referred to as an MTC device. As one particular example, the WD can be a UE implementing the 3GPP narrow band internet of things (NB-IoT) standard. Particular examples of such machines or devices are sensors, metering devices such as power meters, industrial machinery, or home or personal appliances (e.g., refrigerators, televisions, etc.) personal wearables (e.g., watches, fitness trackers, etc.). In other scenarios, a WD can represent a vehicle or other equipment that is capable of monitoring and/or reporting on its operational status or other functions associated with its operation. A WD as described above can represent the endpoint of a wireless connection, in which case the device can be referred to as a wireless terminal. Furthermore, a WD as described above can be mobile, in which case it can also be referred to as a mobile device or a mobile terminal.

As illustrated, wireless device 1310 includes antenna 1311, interface 1314, processing circuitry 1320, device readable medium 1330, user interface equipment 1332, auxiliary equipment 1334, power source 1336 and power circuitry 1337. WD 1310 can include multiple sets of one or more of the illustrated components for different wireless technologies supported by WD 1310, such as, for example, GSM, WCDMA, LTE, NR, WiFi, WiMAX, or Bluetooth wireless technologies, just to mention a few. These wireless technologies can be integrated into the same or different chips or set of chips as other components within WD 1310.

Antenna 1311 can include one or more antennas or antenna arrays, configured to send and/or receive wireless signals, and is connected to interface 1314. In certain alternative embodiments, antenna 1311 can be separate from WD 1310 and be connectable to WD 1310 through an interface or port. Antenna 1311, interface 1314, and/or processing circuitry 1320 can be configured to perform any receiving or transmitting operations described herein as being performed by a WD. Any information, data and/or signals can be received from a network node and/or another WD. In some embodiments, radio front end circuitry and/or antenna 1311 can be considered an interface.

As illustrated, interface 1314 comprises radio front end circuitry 1312 and antenna 1311. Radio front end circuitry 1312 comprise one or more filters 1318 and amplifiers 1316. Radio front end circuitry 1314 is connected to antenna 1311 and processing circuitry 1320, and can be configured to condition signals communicated between antenna 1311 and processing circuitry 1320. Radio front end circuitry 1312 can be coupled to or a part of antenna 1311. In some embodiments, WD 1310 may not include separate radio front end circuitry 1312; rather, processing circuitry 1320 can comprise radio front end circuitry and can be connected to antenna 1311. Similarly, in some embodiments, some or all of RF transceiver circuitry 1322 can be considered a part of interface 1314. Radio front end circuitry 1312 can receive digital data that is to be sent out to other network nodes or WDs via a wireless connection. Radio front end circuitry 1312 can convert the digital data into a radio signal having the appropriate channel and bandwidth parameters using a combination of filters 1318 and/or amplifiers 1316. The radio signal can then be transmitted via antenna 1311. Similarly, when receiving data, antenna 1311 can collect radio signals which are then converted into digital data by radio front end circuitry 1312. The digital data can be passed to processing circuitry 1320. In other embodiments, the interface can comprise different components and/or different combinations of components.

Processing circuitry 1320 can comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 1310 components, such as device readable medium 1330, WD 1310 functionality. Such functionality can include providing any of the various wireless features or benefits discussed herein. For example, processing circuitry 1320 can execute instructions stored in device readable medium 1330 or in memory within processing circuitry 1320 to provide the functionality disclosed herein.

As illustrated, processing circuitry 1320 includes one or more of RF transceiver circuitry 1322, baseband processing circuitry 1324, and application processing circuitry 1326. In other embodiments, the processing circuitry can comprise different components and/or different combinations of components. In certain embodiments processing circuitry 1320 of WD 1310 can comprise a SOC. In some embodiments, RF transceiver circuitry 1322, baseband processing circuitry 1324, and application processing circuitry 1326 can be on separate chips or sets of chips. In alternative embodiments, part or all of baseband processing circuitry 1324 and application processing circuitry 1326 can be combined into one chip or set of chips, and RF transceiver circuitry 1322 can be on a separate chip or set of chips. In still alternative embodiments, part or all of RF transceiver circuitry 1322 and baseband processing circuitry 1324 can be on the same chip or set of chips, and application processing circuitry 1326 can be on a separate chip or set of chips. In yet other alternative embodiments, part or all of RF transceiver circuitry 1322, baseband processing circuitry 1324, and application processing circuitry 1326 can be combined in the same chip or set of chips. In some embodiments, RF transceiver circuitry 1322 can be a part of interface 1314. RF transceiver circuitry 1322 can condition RF signals for processing circuitry 1320.

In certain embodiments, some or all of the functionality described herein as being performed by a WD can be provided by processing circuitry 1320 executing instructions stored on device readable medium 1330, which in certain embodiments can be a computer-readable storage medium. In alternative embodiments, some or all of the functionality can be provided by processing circuitry 1320 without executing instructions stored on a separate or discrete device readable storage medium, such as in a hard-wired manner. In any of those particular embodiments, whether executing instructions stored on a device readable storage medium or not, processing circuitry 1320 can be configured to perform the described functionality. The benefits provided by such functionality are not limited to processing circuitry 1320 alone or to other components of WD 1310, but are enjoyed by WD 1310 as a whole, and/or by end users and the wireless network generally.

Processing circuitry 1320 can be configured to perform any determining, calculating, or similar operations (e.g., certain obtaining operations) described herein as being performed by a WD. These operations, as performed by processing circuitry 1320, can include processing information obtained by processing circuitry 1320 by, for example, converting the obtained information into other information, comparing the obtained information or converted information to information stored by WD 1310, and/or performing one or more operations based on the obtained information or converted information, and as a result of said processing making a determination.

Device readable medium 1330 can be operable to store a computer program, software, an application including one or more of logic, rules, code, tables, etc. and/or other instructions capable of being executed by processing circuitry 1320. Device readable medium 1330 can include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that can be used by processing circuitry 1320. In some embodiments, processing circuitry 1320 and device readable medium 1330 can be considered to be integrated.

User interface equipment 1332 can include components that allow and/or facilitate a human user to interact with WD 1310. Such interaction can be of many forms, such as visual, audial, tactile, etc. User interface equipment 1332 can be operable to produce output to the user and to allow and/or facilitate the user to provide input to WD 1310. The type of interaction can vary depending on the type of user interface equipment 1332 installed in WD 1310. For example, if WD 1310 is a smart phone, the interaction can be via a touch screen; if WD 1310 is a smart meter, the interaction can be through a screen that provides usage (e.g., the number of gallons used) or a speaker that provides an audible alert (e.g., if smoke is detected). User interface equipment 1332 can include input interfaces, devices and circuits, and output interfaces, devices and circuits. User interface equipment 1332 can be configured to allow and/or facilitate input of information into WD 1310 and is connected to processing circuitry 1320 to allow and/or facilitate processing circuitry 1320 to process the input information. User interface equipment 1332 can include, for example, a microphone, a proximity or other sensor, keys/buttons, a touch display, one or more cameras, a USB port, or other input circuitry. User interface equipment 1332 is also configured to allow and/or facilitate output of information from WD 1310, and to allow and/or facilitate processing circuitry 1320 to output information from WD 1310. User interface equipment 1332 can include, for example, a speaker, a display, vibrating circuitry, a USB port, a headphone interface, or other output circuitry. Using one or more input and output interfaces, devices, and circuits, of user interface equipment 1332, WD 1310 can communicate with end users and/or the wireless network, and allow and/or facilitate them to benefit from the functionality described herein.

Auxiliary equipment 1334 is operable to provide more specific functionality which may not be generally performed by WDs. This can comprise specialized sensors for doing measurements for various purposes, interfaces for additional types of communication such as wired communications etc. The inclusion and type of components of auxiliary equipment 1334 can vary depending on the embodiment and/or scenario.

Power source 1336 can, in some embodiments, be in the form of a battery or battery pack. Other types of power sources, such as an external power source (e.g., an electricity outlet), photovoltaic devices or power cells, can also be used. WD 1310 can further comprise power circuitry 1337 for delivering power from power source 1336 to the various parts of WD 1310 which need power from power source 1336 to carry out any functionality described or indicated herein. Power circuitry 1337 can in certain embodiments comprise power management circuitry. Power circuitry 1337 can additionally or alternatively be operable to receive power from an external power source; in which case WD 1310 can be connectable to the external power source (such as an electricity outlet) via input circuitry or an interface such as an electrical power cable. Power circuitry 1337 can also in certain embodiments be operable to deliver power from an external power source to power source 1336. This can be, for example, for the charging of power source 1336. Power circuitry 1337 can perform any converting or other modification to the power from power source 1336 to make it suitable for supply to the respective components of WD 1310.

Figure 14:
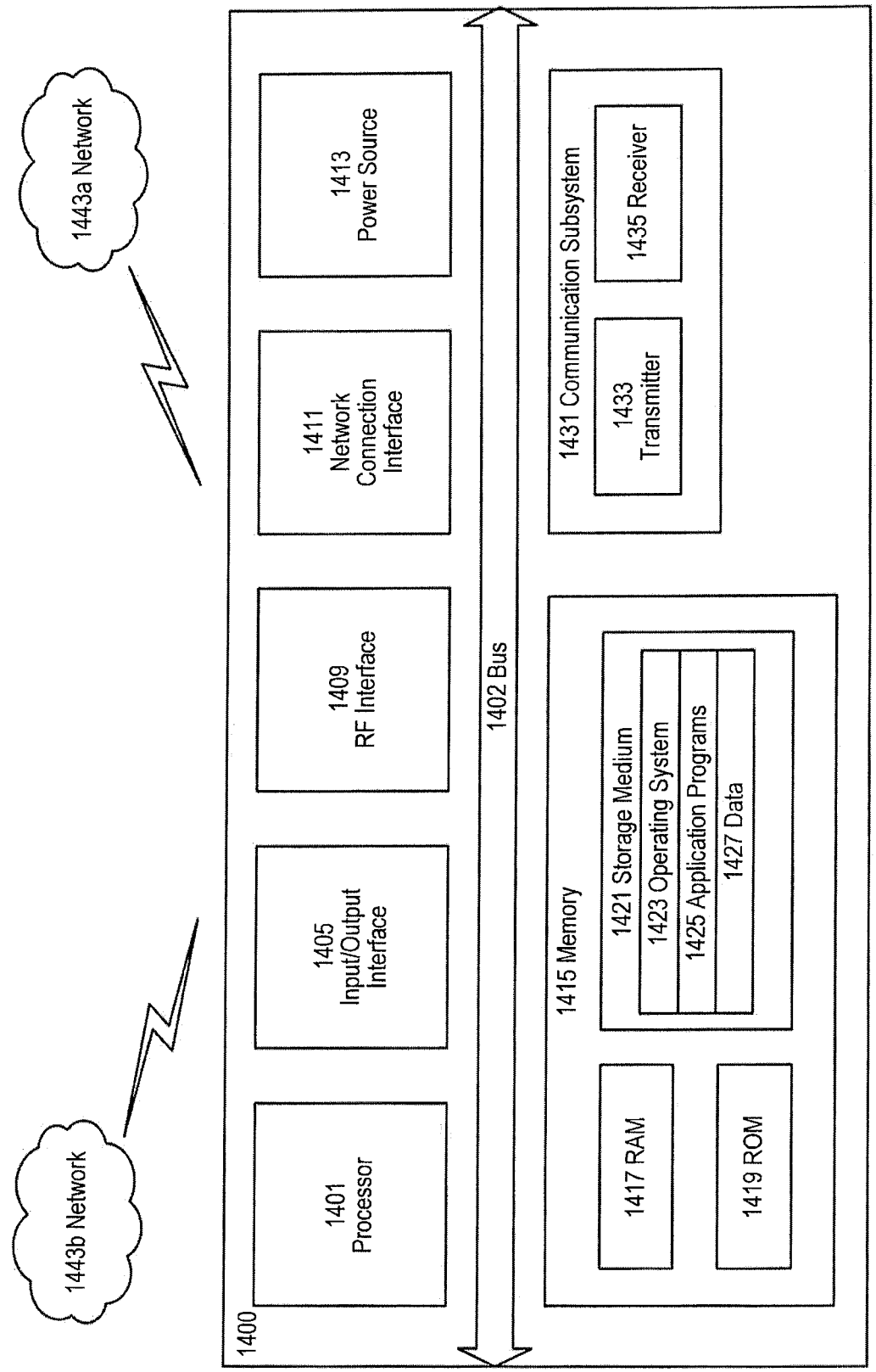
FIG. 14 illustrates an exemplary embodiment of a UE, according to various exemplary embodiments of the present disclosure.

FIG. 14 illustrates one embodiment of a UE in accordance with various aspects described herein. As used herein, a user equipment or UE may not necessarily have a user in the sense of a human user who owns and/or operates the relevant device. Instead, a UE can represent a device that is intended for sale to, or operation by, a human user but which may not, or which may not initially, be associated with a specific human user (e.g., a smart sprinkler controller). Alternatively, a UE can represent a device that is not intended for sale to, or operation by, an end user but which can be associated with or operated for the benefit of a user (e.g., a smart power meter). UE 14200 can be any UE identified by the 3$^{rd}$ Generation Partnership Project (3GPP), including a NB-IoT UE, a machine type communication (MTC) UE, and/or an enhanced MTC (eMTC) UE. UE 1400, as illustrated in FIG. 14, is one example of a WD configured for communication in accordance with one or more communication standards promulgated by the 3$^{rd}$ Generation Partnership Project (3GPP), such as 3GPP's GSM, UMTS, LTE, and/or 5G standards. As mentioned previously, the term WD and UE can be used interchangeably. Accordingly, although FIG. 14 is a UE, the components discussed herein are equally applicable to a WD, and vice-versa.

In FIG. 14, UE 1400 includes processing circuitry 1401 that is operatively coupled to input/output interface 1405, radio frequency (RF) interface 1409, network connection interface 1411, memory 1415 including random access memory (RAM) 1417, read-only memory (ROM) 1419, and storage medium 1421 or the like, communication subsystem 1431, power source 1433, and/or any other component, or any combination thereof. Storage medium 1421 includes operating system 1423, application program 1425, and data 1427. In other embodiments, storage medium 1421 can include other similar types of information. Certain UEs can utilize all of the components shown in FIG. 14, or only a subset of the components. The level of integration between the components can vary from one UE to another UE. Further, certain UEs can contain multiple instances of a component, such as multiple processors, memories, transceivers, transmitters, receivers, etc.

In FIG. 14, processing circuitry 1401 can be configured to process computer instructions and data. Processing circuitry 1401 can be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 1401 can include two central processing units (CPUs). Data can be information in a form suitable for use by a computer.

In the depicted embodiment, input/output interface 1405 can be configured to provide a communication interface to an input device, output device, or input and output device. UE 1400 can be configured to use an output device via input/output interface 1405. An output device can use the same type of interface port as an input device. For example, a USB port can be used to provide input to and output from UE 1400. The output device can be a speaker, a sound card, a video card, a display, a monitor, a printer, an actuator, an emitter, a smartcard, another output device, or any combination thereof. UE 1400 can be configured to use an input device via input/output interface 1405 to allow and/or facilitate a user to capture information into UE 1400. The input device can include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display can include a capacitive or resistive touch sensor to sense input from a user. A sensor can be, for instance, an accelerometer, a gyroscope, a tilt sensor, a force sensor, a magnetometer, an optical sensor, a proximity sensor, another like sensor, or any combination thereof. For example, the input device can be an accelerometer, a magnetometer, a digital camera, a microphone, and an optical sensor.

In FIG. 14, RF interface 1409 can be configured to provide a communication interface to RF components such as a transmitter, a receiver, and an antenna. Network connection interface 1411 can be configured to provide a communication interface to network 1443a. Network 1443a can encompass wired and/or wireless networks such as a local-area network (LAN), a wide-area network (WAN), a computer network, a wireless network, a telecommunications network, another like network or any combination thereof. For example, network 1443a can comprise a Wi-Fi network. Network connection interface 1411 can be configured to include a receiver and a transmitter interface used to communicate with one or more other devices over a communication network according to one or more communication protocols, such as Ethernet, TCP/IP, SONET, ATM, or the like. Network connection interface 1411 can implement receiver and transmitter functionality appropriate to the communication network links (e.g., optical, electrical, and the like). The transmitter and receiver functions can share circuit components, software or firmware, or alternatively can be implemented separately.

RAM 1417 can be configured to interface via bus 1402 to processing circuitry 1401 to provide storage or caching of data or computer instructions during the execution of software programs such as the operating system, application programs, and device drivers. ROM 1419 can be configured to provide computer instructions or data to processing circuitry 1401. For example, ROM 1419 can be configured to store invariant low-level system code or data for basic system functions such as basic input and output (I/O), startup, or reception of keystrokes from a keyboard that are stored in a non-volatile memory. Storage medium 1421 can be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 1421 can be configured to include operating system 1423, application program 1425 such as a web browser application, a widget or gadget engine or another application, and data file 1427. Storage medium 1421 can store, for use by UE 1400, any of a variety of various operating systems or combinations of operating systems.

Storage medium 1421 can be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 1421 can allow and/or facilitate UE 1400 to access computer-executable instructions, application programs or the like, stored on transitory or non-transitory memory media, to off-load data, or to upload data. An article of manufacture, such as one utilizing a communication system can be tangibly embodied in storage medium 1421, which can comprise a device readable medium.

In FIG. 14, processing circuitry 1401 can be configured to communicate with network 1443b using communication subsystem 1431. Network 1443a and network 1443b can be the same network or networks or different network or networks. Communication subsystem 1431 can be configured to include one or more transceivers used to communicate with network 1443b. For example, communication subsystem 1431 can be configured to include one or more transceivers used to communicate with one or more remote transceivers of another device capable of wireless communication such as another WD, UE, or base station of a radio access network (RAN) according to one or more communication protocols, such as IEEE 802.14, CDMA, WCDMA, GSM, LTE, UTRAN, WiMax, or the like. Each transceiver can include transmitter 1433 and/or receiver 1435 to implement transmitter or receiver functionality, respectively, appropriate to the RAN links (e.g., frequency allocations and the like). Further, transmitter 1433 and receiver 1435 of each transceiver can share circuit components, software or firmware, or alternatively can be implemented separately.

In the illustrated embodiment, the communication functions of communication subsystem 1431 can include data communication, voice communication, multimedia communication, short-range communications such as Bluetooth, near-field communication, location-based communication such as the use of the global positioning system (GPS) to determine a location, another like communication function, or any combination thereof. For example, communication subsystem 1431 can include cellular communication, Wi-Fi communication, Bluetooth communication, and GPS communication. Network 1443b can encompass wired and/or wireless networks such as a local-area network (LAN), a wide-area network (WAN), a computer network, a wireless network, a telecommunications network, another like network or any combination thereof. For example, network 1443b can be a cellular network, a Wi-Fi network, and/or a near-field network. Power source 1413 can be configured to provide alternating current (AC) or direct current (DC) power to components of UE 1400.

The features, benefits and/or functions described herein can be implemented in one of the components of UE 1400 or partitioned across multiple components of UE 1400. Further, the features, benefits, and/or functions described herein can be implemented in any combination of hardware, software or firmware. In one example, communication subsystem 1431 can be configured to include any of the components described herein. Further, processing circuitry 1401 can be configured to communicate with any of such components over bus 1402. In another example, any of such components can be represented by program instructions stored in memory that when executed by processing circuitry 1401 perform the corresponding functions described herein. In another example, the functionality of any of such components can be partitioned between processing circuitry 1401 and communication subsystem 1431. In another example, the non-computationally intensive functions of any of such components can be implemented in software or firmware and the computationally intensive functions can be implemented in hardware.

Figure 15:
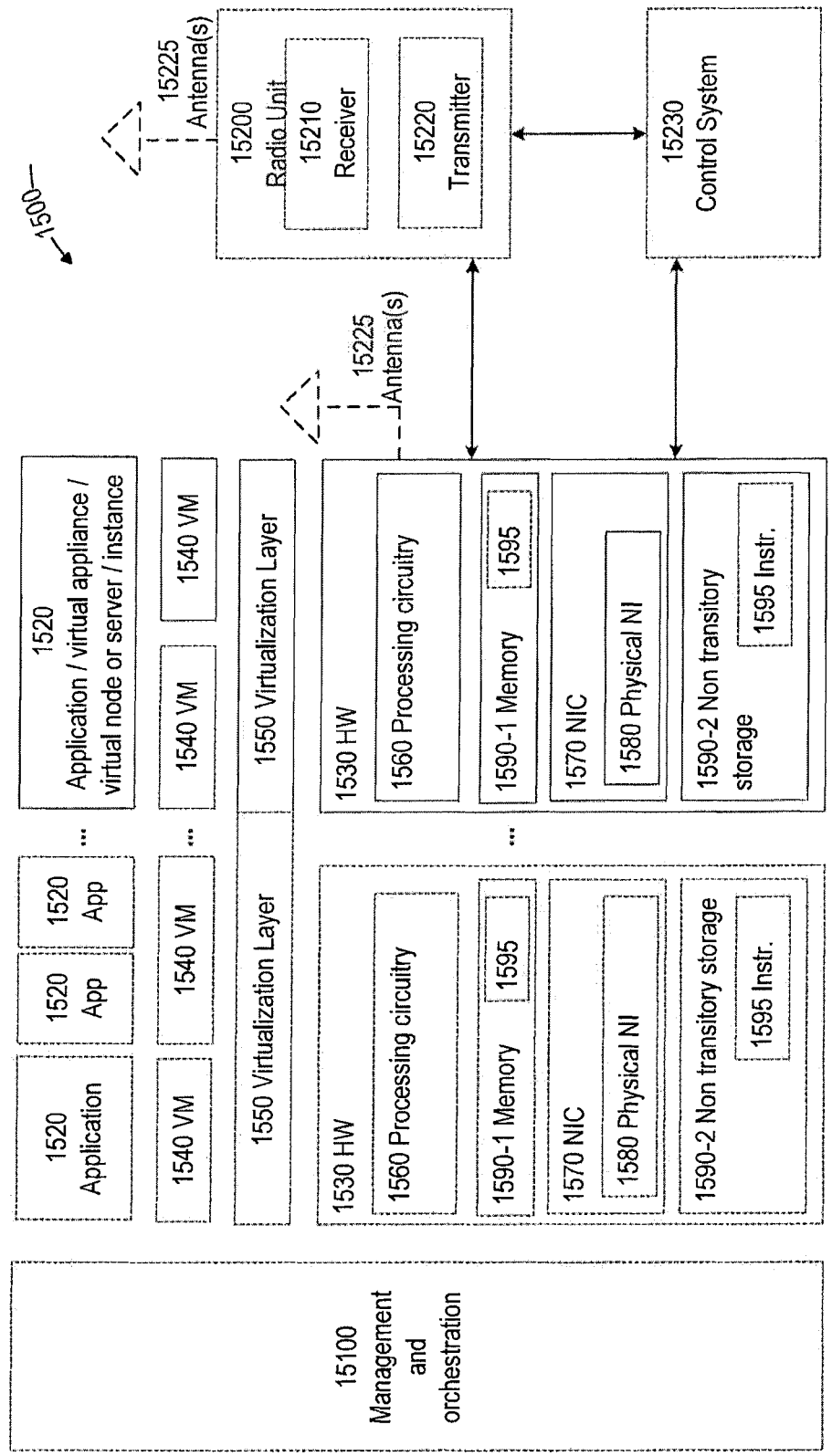
FIG. 15 is a block diagram illustrating an exemplary virtualization environment usable for implementation of various embodiments described herein.

FIG. 15 is a schematic block diagram illustrating a virtualization environment 1500 in which functions implemented by some embodiments can be virtualized. In the present context, virtualizing means creating virtual versions of apparatuses or devices which can include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein can be implemented as virtual components executed by one or more virtual machines implemented in one or more virtual environments 1500 hosted by one or more of hardware nodes 1530. Further, in embodiments in which the virtual node is not a radio access node or does not require radio connectivity (e.g., a core network node), then the network node can be entirely virtualized.

The functions can be implemented by one or more applications 1520 (which can alternatively be called software instances, virtual appliances, network functions, virtual nodes, virtual network functions, etc.) operative to implement some of the features, functions, and/or benefits of some of the embodiments disclosed herein. Applications 1520 are run in virtualization environment 1500 which provides hardware 1530 comprising processing circuitry 1560 and memory 1590. Memory 1590 contains instructions 1595 executable by processing circuitry 1560 whereby application 1520 is operative to provide one or more of the features, benefits, and/or functions disclosed herein.

Virtualization environment 1500, comprises general-purpose or special-purpose network hardware devices 1530 comprising a set of one or more processors or processing circuitry 1560, which can be commercial off-the-shelf (COTS) processors, dedicated Application Specific Integrated Circuits (ASICs), or any other type of processing circuitry including digital or analog hardware components or special purpose processors. Each hardware device can comprise memory 1590-1 which can be non-persistent memory for temporarily storing instructions 1595 or software executed by processing circuitry 1560. Each hardware device can comprise one or more network interface controllers (NICs) 1570, also known as network interface cards, which include physical network interface 1580. Each hardware device can also include non-transitory, persistent, machine-readable storage media 1590-2 having stored therein software 1595 and/or instructions executable by processing circuitry 1560. Software 1595 can include any type of software including software for instantiating one or more virtualization layers 1550 (also referred to as hypervisors), software to execute virtual machines 1540 as well as software allowing it to execute functions, features and/or benefits described in relation with some embodiments described herein.

Virtual machines 1540, comprise virtual processing, virtual memory, virtual networking or interface and virtual storage, and can be run by a corresponding virtualization layer 1550 or hypervisor. Different embodiments of the instance of virtual appliance 1520 can be implemented on one or more of virtual machines 1540, and the implementations can be made in different ways.

During operation, processing circuitry 1560 executes software 1595 to instantiate the hypervisor or virtualization layer 1550, which can sometimes be referred to as a virtual machine monitor (VMM). Virtualization layer 1550 can present a virtual operating platform that appears like networking hardware to virtual machine 1540.

As shown in FIG. 15, hardware 1530 can be a standalone network node with generic or specific components. Hardware 1530 can comprise antenna 15225 and can implement some functions via virtualization. Alternatively, hardware 1530 can be part of a larger cluster of hardware (e.g., such as in a data center or customer premise equipment (CPE)) where many hardware nodes work together and are managed via management and orchestration (MANO) 15100, which, among others, oversees lifecycle management of applications 1520.

Virtualization of the hardware is in some contexts referred to as network function virtualization (NFV). NFV can be used to consolidate many network equipment types onto industry standard high volume server hardware, physical switches, and physical storage, which can be located in data centers, and customer premise equipment.

In the context of NFV, virtual machine 1540 can be a software implementation of a physical machine that runs programs as if they were executing on a physical, non-virtualized machine. Each of virtual machines 1540, and that part of hardware 1530 that executes that virtual machine, be it hardware dedicated to that virtual machine and/or hardware shared by that virtual machine with others of the virtual machines 1540, forms a separate virtual network elements (VNE).

Still in the context of NFV, Virtual Network Function (VNF) is responsible for handling specific network functions that run in one or more virtual machines 1540 on top of hardware networking infrastructure 1530 and corresponds to application 1520 in FIG. 15.

In some embodiments, one or more radio units 15200 that each include one or more transmitters 15220 and one or more receivers 15210 can be coupled to one or more antennas 15225. Radio units 15200 can communicate directly with hardware nodes 1530 via one or more appropriate network interfaces and can be used in combination with the virtual components to provide a virtual node with radio capabilities, such as a radio access node or a base station.

In some embodiments, some signaling can be performed by control system 15230 which can alternatively be used for communication between the hardware nodes 1530 and radio units 15200.

Figure 16:
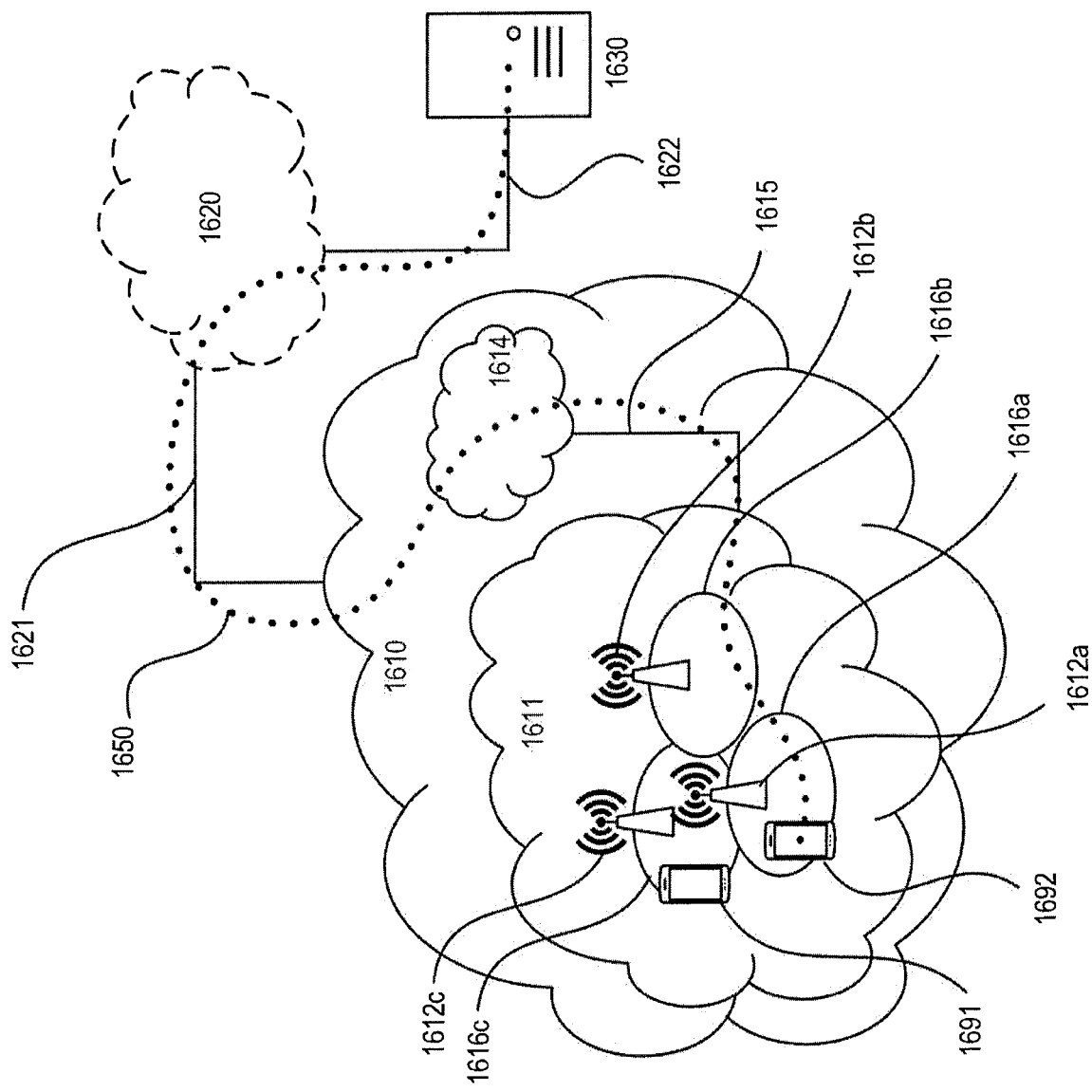
FIGS. 16-17 are block diagrams of various exemplary communication systems and/or networks, according to various exemplary embodiments of the present disclosure.

With reference to FIG. 16, in accordance with an embodiment, a communication system includes telecommunication network 1610, such as a 3GPP-type cellular network, which comprises access network 1611, such as a radio access network, and core network 1614. Access network 1611 comprises a plurality of base stations 1612a, 1612b, 1612c, such as NBs, eNBs, gNBs or other types of wireless access points, each defining a corresponding coverage area 1613a, 1613b, 1613c. Each base station 1612a, 1612b, 1612c is connectable to core network 1614 over a wired or wireless connection 1615. A first UE 1691 located in coverage area 1613c can be configured to wirelessly connect to, or be paged by, the corresponding base station 1612c. A second UE 1692 in coverage area 1613a is wirelessly connectable to the corresponding base station 1612a. While a plurality of UEs 1691, 1692 are illustrated in this example, the disclosed embodiments are equally applicable to a situation where a sole UE is in the coverage area or where a sole UE is connecting to the corresponding base station 1612.

Telecommunication network 1610 is itself connected to host computer 1630, which can be embodied in the hardware and/or software of a standalone server, a cloud-implemented server, a distributed server or as processing resources in a server farm. Host computer 1630 can be under the ownership or control of a service provider or can be operated by the service provider or on behalf of the service provider. Connections 1621 and 1622 between telecommunication network 1610 and host computer 1630 can extend directly from core network 1614 to host computer 1630 or can go via an optional intermediate network 1620. Intermediate network 1620 can be one of, or a combination of more than one of, a public, private or hosted network; intermediate network 1620, if any, can be a backbone network or the Internet; in particular, intermediate network 1620 can comprise two or more sub-networks (not shown).

The communication system of FIG. 16 as a whole enables connectivity between the connected UEs 1691, 1692 and host computer 1630. The connectivity can be described as an over-the-top (OTT) connection 1650. Host computer 1630 and the connected UEs 1691, 1692 are configured to communicate data and/or signaling via OTT connection 1650, using access network 1611, core network 1614, any intermediate network 1620 and possible further infrastructure (not shown) as intermediaries. OTT connection 1650 can be transparent in the sense that the participating communication devices through which OTT connection 1650 passes are unaware of routing of uplink and downlink communications. For example, base station 1612 may not or need not be informed about the past routing of an incoming downlink communication with data originating from host computer 1630 to be forwarded (e.g., handed over) to a connected UE 1691. Similarly, base station 1612 need not be aware of the future routing of an outgoing uplink communication originating from the UE 1691 towards the host computer 1630.

Example implementations, in accordance with an embodiment, of the UE, base station and host computer discussed in the preceding paragraphs will now be described with reference to FIG. 17. In communication system 1700, host computer 1710 comprises hardware 1715 including communication interface 1716 configured to set up and maintain a wired or wireless connection with an interface of a different communication device of communication system 1700. Host computer 1710 further comprises processing circuitry 1718, which can have storage and/or processing capabilities. In particular, processing circuitry 1718 can comprise one or more programmable processors, application-specific integrated circuits, field programmable gate arrays or combinations of these (not shown) adapted to execute instructions. Host computer 1710 further comprises software 1711, which is stored in or accessible by host computer 1710 and executable by processing circuitry 1718. Software 1711 includes host application 1712. Host application 1712 can be operable to provide a service to a remote user, such as UE 1730 connecting via OTT connection 1750 terminating at UE 1730 and host computer 1710. In providing the service to the remote user, host application 1712 can provide user data which is transmitted using OTT connection 1750.

Communication system 1700 can also include base station 1720 provided in a telecommunication system and comprising hardware 1725 enabling it to communicate with host computer 1710 and with UE 1730. Hardware 1725 can include communication interface 1726 for setting up and maintaining a wired or wireless connection with an interface of a different communication device of communication system 1700, as well as radio interface 1727 for setting up and maintaining at least wireless connection 1770 with UE 1730 located in a coverage area (not shown in FIG. 17) served by base station 1720. Communication interface 1726 can be configured to facilitate connection 1760 to host computer 1710. Connection 1760 can be direct, or it can pass through a core network (not shown in FIG. 17) of the telecommunication system and/or through one or more intermediate networks outside the telecommunication system. In the embodiment shown, hardware 1725 of base station 1720 can also include processing circuitry 1728, which can comprise one or more programmable processors, application-specific integrated circuits, field programmable gate arrays or combinations of these (not shown) adapted to execute instructions. Base station 1720 further has software 1721 stored internally or accessible via an external connection.

Communication system 1700 can also include UE 1730, which includes radio interface 1737 configured to set up and maintain wireless connection 1770 with a base station serving a coverage area in which UE 1730 is currently located. Hardware 1735 of UE 1730 can also include processing circuitry 1738, which can comprise one or more programmable processors, application-specific integrated circuits, field programmable gate arrays or combinations of these (not shown) adapted to execute instructions. UE 1730 further comprises software 1731, which is stored in or accessible by UE 1730 and executable by processing circuitry 1738. Software 1731 includes client application 1732. Client application 1732 can be operable to provide a service to a human or non-human user via UE 1730, with the support of host computer 1710. In host computer 1710, an executing host application 1712 can communicate with the executing client application 1732 via OTT connection 1750 terminating at UE 1730 and host computer 1710. In providing the service to the user, client application 1732 can receive request data from host application 1712 and provide user data in response to the request data. OTT connection 1750 can transfer both the request data and the user data. Client application 1732 can interact with the user to generate the user data that it provides.

Figure 17:
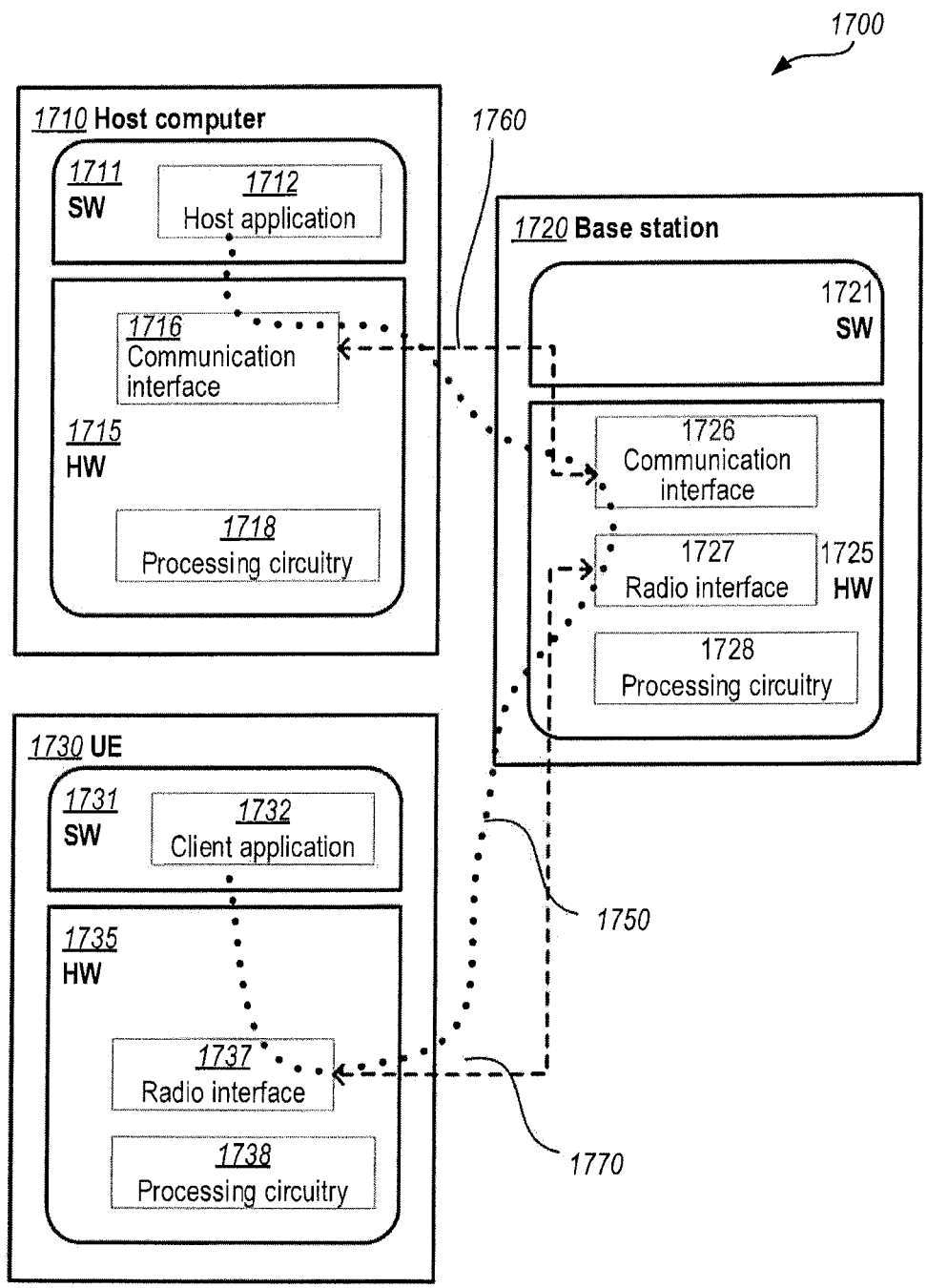

It is noted that host computer 1710, base station 1720 and UE 1730 illustrated in FIG. 17 can be similar or identical to host computer 1230, one of base stations 1612*a*, 1612*b*, 1612*c* and one of UEs 1691, 1692 of FIG. 16, respectively. This is to say, the inner workings of these entities can be as shown in FIG. 17 and independently, the surrounding network topology can be that of FIG. 16.

In FIG. 17, OTT connection 1750 has been drawn abstractly to illustrate the communication between host computer 1710 and UE 1730 via base station 1720, without explicit reference to any intermediary devices and the precise routing of messages via these devices. Network infrastructure can determine the routing, which it can be configured to hide from UE 1730 or from the service provider operating host computer 1710, or both. While OTT connection 1750 is active, the network infrastructure can further take decisions by which it dynamically changes the routing (e.g., on the basis of load balancing consideration or reconfiguration of the network).

Wireless connection 1770 between UE 1730 and base station 1720 is in accordance with the teachings of the embodiments described throughout this disclosure. One or more of the various embodiments improve the performance of OTT services provided to UE 1730 using OTT connection 1750, in which wireless connection 1770 forms the last segment. More precisely, the exemplary embodiments disclosed herein can improve flexibility for the network to monitor end-to-end quality-of-service (QoS) of data flows, including their corresponding radio bearers, associated with data sessions between a user equipment (UE) and another entity, such as an OTT data application or service external to the 5G network. These and other advantages can facilitate more timely design, implementation, and deployment of 5G/NR solutions. Furthermore, such embodiments can facilitate flexible and timely control of data session QoS, which can lead to improvements in capacity, throughput, latency, etc. that are envisioned by 5G/NR and important for the growth of OTT services.

A measurement procedure can be provided for the purpose of monitoring data rate, latency and other network operational aspects on which the one or more embodiments improve. There can further be an optional network functionality for reconfiguring OTT connection 1750 between host computer 1710 and UE 1730, in response to variations in the measurement results. The measurement procedure and/or the network functionality for reconfiguring OTT connection 1750 can be implemented in software 1711 and hardware 1715 of host computer 1710 or in software 1731 and hardware 1735 of UE 1730, or both. In embodiments, sensors (not shown) can be deployed in or in association with communication devices through which OTT connection 1750 passes; the sensors can participate in the measurement procedure by supplying values of the monitored quantities exemplified above, or supplying values of other physical quantities from which software 1711, 1731 can compute or estimate the monitored quantities. The reconfiguring of OTT connection 1750 can include message format, retransmission settings, preferred routing etc.; the reconfiguring need not affect base station 1720, and it can be unknown or imperceptible to base station 1720. Such procedures and functionalities can be known and practiced in the art. In certain embodiments, measurements can involve proprietary UE signaling facilitating host computer 1710's measurements of throughput, propagation times, latency and the like. The measurements can be implemented in that software 1711 and 1731 causes messages to be transmitted, in particular empty or 'dummy' messages, using OTT connection 1750 while it monitors propagation times, errors, etc.

FIG. 18 is a flowchart illustrating an exemplary method and/or procedure implemented in a communication system, in accordance with one embodiment. The communication system includes a host computer, a base station and a UE which, in some exemplary embodiments, can be those described with reference to other figures herein. For simplicity of the present disclosure, only drawing references to FIG. 18 will be included in this section. In step 1810, the host computer provides user data. In substep 1811 (which can be optional) of step 1810, the host computer provides the user data by executing a host application. In step 1820, the host computer initiates a transmission carrying the user data to the UE. In step 1830 (which can be optional), the base station transmits to the UE the user data which was carried in the transmission that the host computer initiated, in accordance with the teachings of the embodiments described throughout this disclosure. In step 1840 (which can also be optional), the UE executes a client application associated with the host application executed by the host computer.

FIG. 19 is a flowchart illustrating an exemplary method and/or procedure implemented in a communication system, in accordance with one embodiment. The communication system includes a host computer, a base station and a UE which can be those described with reference to other figures herein. For simplicity of the present disclosure, only drawing references to FIG. 19 will be included in this section. In step 1910 of the method, the host computer provides user data. In an optional substep (not shown) the host computer provides the user data by executing a host application. In step 1920, the host computer initiates a transmission carrying the user data to the UE. The transmission can pass via the base station, in accordance with the teachings of the embodiments described throughout this disclosure. In step 1930 (which can be optional), the UE receives the user data carried in the transmission.

FIG. 20 is a flowchart illustrating an exemplary method and/or procedure implemented in a communication system, in accordance with one embodiment. The communication system includes a host computer, a base station and a UE which can be those described with reference to other figures herein. For simplicity of the present disclosure, only drawing references to FIG. 20 will be included in this section. In step 2010 (which can be optional), the UE receives input data provided by the host computer. Additionally or alternatively, in step 2020, the UE provides user data. In substep 2021 (which can be optional) of step 2020, the UE provides the user data by executing a client application. In substep 2011 (which can be optional) of step 2010, the UE executes a client application which provides the user data in reaction to the received input data provided by the host computer. In providing the user data, the executed client application can further consider user input received from the user. Regardless of the specific manner in which the user data was provided, the UE initiates, in substep 2030 (which can be optional), transmission of the user data to the host computer. In step 2040 of the method, the host computer receives the user data transmitted from the UE, in accordance with the teachings of the embodiments described throughout this disclosure.

FIG. 21 is a flowchart illustrating an exemplary method and/or procedure implemented in a communication system, in accordance with one embodiment. The communication system includes a host computer, a base station and a UE which can be those described with reference to other figures herein. For simplicity of the present disclosure, only drawing references to FIG. 21 will be included in this section. In step 2110 (which can be optional), in accordance with the teachings of the embodiments described throughout this disclosure, the base station receives user data from the UE. In step 2120 (which can be optional), the base station initiates transmission of the received user data to the host computer. In step 2130 (which can be optional), the host computer receives the user data carried in the transmission initiated by the base station.

The foregoing merely illustrates the principles of the disclosure. Various modifications and alterations to the described embodiments will be apparent to those skilled in the art in view of the teachings herein. It will thus be appreciated that those skilled in the art will be able to devise numerous systems, arrangements, and procedures that, although not explicitly shown or described herein, embody the principles of the disclosure and can be thus within the spirit and scope of the disclosure. Various exemplary embodiments can be used together with one another, as well as interchangeably therewith, as should be understood by those having ordinary skill in the art.

The term unit, as used herein, can have conventional meaning in the field of electronics, electrical devices and/or electronic devices and can include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processor (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

As described herein, device and/or apparatus can be represented by a semiconductor chip, a chipset, or a (hardware) module comprising such chip or chipset; this, however, does not exclude the possibility that a functionality of a device or apparatus, instead of being hardware implemented, be implemented as a software module such as a computer program or a computer program product comprising executable software code portions for execution or being run on a processor. Furthermore, functionality of a device or apparatus can be implemented by any combination of hardware and software. A device or apparatus can also be regarded as an assembly of multiple devices and/or apparatuses, whether functionally in cooperation with or independently of each other. Moreover, devices and apparatuses can be implemented in a distributed fashion throughout a system, so long as the functionality of the device or apparatus is preserved. Such and similar principles are considered as known to a skilled person.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

In addition, certain terms used in the present disclosure, including the specification, drawings and exemplary embodiments thereof, can be used synonymously in certain instances, including, but not limited to, e.g., data and information. It should be understood that, while these words and/or other words that can be synonymous to one another, can be used synonymously herein, that there can be instances when such words can be intended to not be used synonymously. Further, to the extent that the prior art knowledge has not been explicitly incorporated by reference herein above, it is explicitly incorporated herein in its entirety. All publications referenced are incorporated herein by reference in their entireties.

Example embodiments of the techniques and apparatus described herein include, but are not limited to, the following enumerated examples:

1. A method, in an application function, AF (660, 1520), for exchanging UE communication pattern information with a core network, CN (298, 398), the method comprising:
provisioning (1010), to a network exposure function, NEF (360, 650, 1520), in the CN, communication information related to one or more user equipment (UEs), the communication information including:
an identifier of an application associated with the AF, and
a plurality of first parameters describing an expected UE communication pattern associated with the application, wherein the plurality of first parameters are arranged in one or more sets associated with respective connection phases;

sending (1020), to the NEF, a subscription request for one or more second parameters describing an actual UE communication pattern associated with the application and the one or more UEs, wherein the subscription request includes the identifier of the application; and receiving (1030), from the NEF, a report including the one or more second parameters.

2. The method of embodiment 1, wherein each set of first parameters is associated with one of the following connection phases: bootstrap, registration, device management, and information reporting.

3. The method of any of embodiments 1-2, wherein each set of first parameters includes one or more of the following first parameters: security, data packet size, number of data packets, traffic volume, number of flows, packet interarrival time, packet round trip delay, and connection origin.

4. The method of embodiment 3, wherein at least one of the first parameters includes one or more of the following: a maximum value, a minimum value, and an average value.

5. The method of any of embodiments 1-4, wherein the one or more second parameters are included in the one or more first parameters.

6. The method of any of embodiments 1-4, wherein the one or more second parameters include at least one parameter not included in the one or more first parameters.

7. The method of any of embodiments 1-6, wherein the communication information provisioned to the NEF also includes identifiers of the plurality of first parameters.

8. The method of any of embodiments 1-7, wherein the subscription request also includes identifiers of the one or more second parameters.

9. The method of any of embodiments 1-8, wherein the report includes second parameters that are associated with a particular connection phase that is also associated with a particular set of the first parameters.

10. A method, performed by a network exposure function, NEF (360, 650, 1520), in a core network, CN (298, 398) for exchanging UE communication pattern information with an application function, AF (660, 1520), the method comprising:

receiving (1110), from the AF, communication information related to one or more user equipment (UEs), the communication information including:
an identifier of an application associated with the AF, and
a plurality of first parameters describing an expected UE communication pattern associated with the application, wherein the plurality of first parameters are arranged in one or more sets associated with respective connection phases;

receiving (1130), from the AF, a subscription request for one or more second parameters describing an actual UE communication pattern associated with the application and the one or more UEs, wherein the subscription request includes the identifier of the application; and sending (1160), to the AF, a report including the one or more second parameters.

11. The method of embodiment 10, wherein each set of first parameters is associated with one of the following connection phases: bootstrap, registration, device management, and information reporting.

12. The method of any of embodiments 10-11, wherein each set of first parameters includes one or more of the following first parameters: security, data packet size, number of data packets, traffic volume, number of flows, packet interarrival time, packet round trip delay, and connection origin.

13. The method of embodiment 12, wherein at least one of the first parameters includes one or more of the following: a maximum value, a minimum value, and an average value.

14. The method of any of embodiments 10-13, wherein the one or more second parameters are included in the one or more first parameters.

15. The method of any of embodiments 10-13, wherein the one or more second parameters include at least one parameter not included in the one or more first parameters.

16. The method of any of embodiments 10-15, wherein the communication information received from the AF also includes identifiers of the plurality of first parameters.

17. The method of any of embodiments 10-16, wherein the subscription request also includes identifiers of the one or more second parameters.

18. The method of any of embodiments 10-17, further comprising:

sending (1115), to a network repository function, NRF (640, 1520), a discovery request to identify a network data analytics function, NWDAF (630, 1520), that supports the first parameters; and receiving (1120), from the NRF, an indication that a first NWDAF supports the first parameters.

sending (1125), to the first NWDAF, a message comprising:
the identifier of the application, and
identifiers of the first parameters.

19. The method of embodiment 18, further comprising:

determining (1135) if the first NWDAF supports the second parameters;

based on determining that the first NWDAF supports the second parameters, sending (1140) a second subscription request to the first NWDAF, the second subscription request including:
the identifier of the application, and
identifiers of the second parameters; and receiving (1155), from the first NWDAF, the report including the one or more second parameters.

20. The method of any of embodiments 18-19, further comprising:

based on determining that the first NWDAF does not support the second parameters, sending (1145), to the NRF, a second discovery request to identify an NWDAF that supports the second parameters; and receiving (1150), from the NRF, an indication that a second NWDAF supports the second parameters, wherein the second subscription request is sent to, and the report received from, the second NWDAF instead of the first NWDAF.

21. The method of any of embodiments 10-20, wherein the report includes second parameters that are associated with a particular connection phase that is also associated with a particular set of the first parameters.

22. A method, performed by a network data analytics function, NWDAF (630, 1520), in a core network, CN (298, 398), for exchanging user equipment, UE, communication pattern information with an application function, AF (660, 1520), the method comprising:

receiving (1230), from a network exposure function, NEF (360, 650, 1520), in the CN, a subscription request associated with the AF, the subscription request including:
an identifier of an application associated with the AF, and identifiers of one or more second parameters describing an actual UE communication pattern associated with the application and with one or more UEs; and sending (1250), to a user plane function, UPF (340, 620, 1520), a request for one or more traffic metrics associated with the second parameters, wherein the request includes the identifier of the application;

receiving (1260) the one or more traffic metrics from the UPF;

determining (1270) the one or more second parameters based on the traffic metrics; and sending (1280), to the NEF, a report including the one or more second parameters.

23. The method of embodiment 22, further comprising:
receiving (1220), from the NEF, a message comprising:
an identifier of an application associated with an application function, AF, and
a plurality of first parameters describing an expected UE communication pattern associated with the application and with one or more UEs, wherein the plurality of first parameters are arranged in one or more sets associated with respective connection phases; and
determining (1240) the one or more traffic metrics, to be requested from the UPF, based on the first parameters and the second parameters.

24. The method of embodiment 23, wherein each set of first parameters is associated with one of the following connection phases: bootstrap, registration, device management, and information reporting.

25. The method of any of embodiments 23-24, wherein each set of first parameters includes one or more of the following first parameters: security, data packet size, number of data packets, traffic volume, number of flows, packet interarrival time, packet round trip delay, and connection origin.

26. The method of embodiment 25, wherein at least one of the first parameters includes one or more of the following: a maximum value, a minimum value, and an average value.

27. The method of any of embodiments 23-26, wherein the one or more second parameters are included in the one or more first parameters.

28. The method of any of embodiments 23-26, wherein the one or more second parameters include at least one parameter not included in the one or more first parameters.

29. The method of any of embodiments 23-28, further comprising, prior to receiving (1220) the message from the NEF, sending (1210) a registration request to a network repository function, NRF (640, 1520), wherein the registration request includes:
an identifier of the NWDAF;
identifiers of one or more services, associated with UE communication information, that are supported by the NWDAF; and
identifiers of one or more parameters, associated with UE communication, that can be generated by the NWDAF.

30. An application function, AF (660, 1520) configured to exchange UE communication pattern information with a core network, CN (298, 398), the AF comprising:
interface circuitry (1570) configured to communicate with a network exposure function, NEF (360, 650, 1520), in the CN; and
processing circuitry (1560) operably coupled to the interface circuitry, whereby the processing circuitry and interface circuitry are configured to perform operations corresponding to any of the methods of embodiments 1-9.

31. An application function, AF (660, 1520) configured to exchange UE communication pattern information with a core network, CN (298, 398), the AF being arranged to perform operations corresponding to any of the methods of embodiments 1-9.

32. A non-transitory, computer-readable medium (1590) storing computer-executable instructions (1595) that, when executed by processing circuitry (1560) associated with an application function, AF (660, 1520), configure the AF to perform operations corresponding to any of the methods of embodiments 1-9.

33. A computer program product comprising computer-executable instructions (1595) that, when executed by processing circuitry (1560) associated with an application function, AF (660, 1520), configure the AF to perform operations corresponding to any of the methods of embodiments 1-9.

34. A core network, CN (298, 398) configured to exchange UE communication pattern information with an application function, AF (660, 1520), the CN comprising:
one or more network nodes (1360, 1530) configured to provide:
a network exposure function, NEF (360, 650, 1520) operable to communicate with the AF, and
a network data analytics function, NWDAF (630, 1520);
wherein the one or more network nodes include processing circuitry (1370, 1560) configured to perform operations corresponding to any of the methods of embodiments 10-29.

35. The CN of embodiment 34, wherein the one or more nodes (1360, 1530) are further configured to provide:
a network repository function, NRF (640, 1520); and
a user plane function, UPF (340, 620, 1520).

36. A core network, CN (298, 398) configured to exchange UE communication pattern information with an application function, AF (660, 1520), the CN being arranged to perform operations corresponding to any of the methods of embodiments 10-29.

37. A non-transitory, computer-readable medium (1380, 1590) storing computer-executable instructions (1595) that, when executed by processing circuitry (1370, 1560) associated with a core network, CN (298, 398), configure the CN to perform operations corresponding to any of the methods of embodiments 10-29.

38. A computer program product comprising computer-executable instructions (1595) that, when executed by processing circuitry (1370, 1560) associated with a core network, CN (298, 398), configure the CN to perform operations corresponding to any of the methods of embodiments 10-29.

The invention claimed is:
1. A method, in an application function, AF, for exchanging UE communication pattern information with a core network, CN, the method comprising:
provisioning, to a network exposure function, NEF, in the CN, communication information related to one or more user equipment, UEs, the communication information including:
an identifier of an application associated with the AF, and
an indication of one or more first parameters describing a first UE communication pattern associated with the application, the one or more first parameters being arranged in one or more sets associated with respective connection phases;

sending, to the NEF, a subscription request, the subscription request including the identifier of the application; and receiving, from the NEF, a report indicative of an analysis of traffic of the application based at least on the one or more first parameters.

2. The method of claim 1, wherein the one or more first parameters describing the first UE communication pattern define a traffic model of traffic of the application to be analyzed in the CN.

3. The method of claim 1, wherein the subscription request is sent for one or more second parameters describing a second UE communication pattern associated with the application and the one or more UEs.

4. The method of claim 3, wherein the one or more second parameters define information about traffic of the application to be reported in the subscription.

5. The method of claim 3, wherein the one or more first parameters and the one or more second parameter jointly define the traffic to be reported in the subscription.

6. The method of claim 1, wherein the communication information triggers the NEF to perform a network data analytics function, NWDAF, discovery procedure based on the one or more first parameters.

7. The method of claim 1, wherein each set of first parameters is associated with one of the following connection phases: bootstrap, registration, device management, and information reporting.

8. The method of claim 1, wherein the communication information further comprises, for a particular first parameter set, information on the associated connection phase.

9. The method of claim 1, wherein at least one of the one or more first parameter includes one or more of the following: security, data packet size, number of data packets, traffic volume, number of flows, packet interarrival time, packet round trip delay, and connection origin.

10. The method of claim 1, wherein at least one of the one or more first parameters includes or is specified by one or more of the following: a maximum value, a minimum value, and an average value.

11. The method of claim 1, wherein at least one of the one or more first parameters is specified in the communication information by a parameter type and an associated parameter value.

12. The method of claim 1, wherein the one or more first parameters describing the first UE communication pattern define traffic characteristics of traffic to be analyzed in the CN.

13. An application function, AF configured to exchange UE communication pattern information with a core network, CN, the AF comprising:
interface circuitry configured to communicate with a network exposure function, NEF, in the CN; and
processing circuitry operably coupled to the interface circuitry, whereby the processing circuitry and interface circuitry are configured to perform operations corresponding to claim 1.

14. An application function, AF configured to exchange UE communication pattern information with a core network, CN, the AF being arranged to perform operations corresponding to the method of claim 1.

15. A method, performed by a network exposure function, NEF, in a core network, CN for exchanging UE communication pattern information with an application function, AF, the method comprising:

receiving, from the AF, communication information related to one or more user equipment (UEs), the communication information including:
an identifier of an application associated with the AF, and
an indication of one or more first parameters describing a first UE communication pattern associated with the application, the one or more first parameters being arranged in one or more sets associated with respective connection phases;
receiving, from the AF, a subscription request, the subscription request including the identifier of the application; and
sending, to the AF, a report indicative of an analysis of traffic of the application based at least on the one or more first parameters.

16. The method of claim 15, wherein receipt of the communication information triggers the NEF to perform a network data analytics function, NWDAF, discovery procedure based on the one or more first parameters.

17. The method of claim 16, wherein the subscription request is received for one or more second parameters describing a second UE communication pattern associated with the application and the one or more UEs and, optionally, wherein receipt of the subscription request triggers the NEF to forward the one or more second parameters to the NWDAF determined by the NWDAF discovery procedure.

18. A core network, CN configured to exchange UE communication pattern information with an application function, AF, the CN comprising:
one or more network nodes configured to provide at least one of:
a network exposure function, NEF operable to communicate with the AF, and
a network data analytics function, NWDAF; and
wherein the one or more network nodes include processing circuitry configured to perform operations corresponding to claim 15.

19. The CN of claim 18, wherein the one or more nodes are further configured to provide at least one of:
a network repository function, NRF; and
a user plane function, UPF.

20. A core network, CN configured to exchange UE communication pattern information with an application function, AF, the CN being arranged to perform operations corresponding to claim 15.

21. A method, performed by a network data analytics function, NWDAF, in a core network, CN, for exchanging user equipment, UE, communication pattern information with an application function, AF, the method comprising:
receiving, from a network exposure function, NEF, in the CN, a message comprising:
an identifier of an application associated with an application function, AF, and
an indication of one or more first parameters describing a first UE communication pattern associated with the application and with one or more UEs, the one or more first parameters being arranged in one or more sets associated with respective connection phases;
receiving, from the NEF, a subscription request associated with the AF, the subscription request including:
the identifier of the application associated with the AF;
sending, to a user plane function, UPF, a request for one or more traffic metrics, the request including the identifier of the application;
receiving the one or more traffic metrics from the UPF;

analyzing the traffic metrics based at least on the one more first parameters; and sending, to the NEF, a report indicative of the analysis.

22. The method of claim 21, further comprising:

receiving, from the NEF, and in the subscription request associated with the AF, identifiers of one or more second parameters describing a second UE communication pattern associated with the application and with one or more UEs; and sending, to the UPF, the request for one or more traffic metrics associated with the one or more second parameters.

* * * * *